(12) United States Patent
Irie et al.

(10) Patent No.: US 9,967,755 B2
(45) Date of Patent: May 8, 2018

(54) METHOD OF SPATIAL SHARING IN WIRELESS COMMUNICATIONS SYSTEM

(71) Applicant: Panasonic Corporation, Osaka (JP)

(72) Inventors: Masataka Irie, Kanagawa (JP); Huang Lei, Singapore (SG); Michael Sim Hong Cheng, Singapore (SG)

(73) Assignee: PANASONIC CORPORATION, Osaka (JP)

( * ) Notice: Subject to any disclaimer, the term of this patent is extended or adjusted under 35 U.S.C. 154(b) by 274 days.

(21) Appl. No.: 14/920,751

(22) Filed: Oct. 22, 2015

(65) Prior Publication Data

US 2016/0142929 A1 May 19, 2016

(30) Foreign Application Priority Data

Nov. 19, 2014 (JP) .................................. 2014-234374

(51) Int. Cl.
| | |
|---|---|
| H04L 1/00 | (2006.01) |
| H04W 24/02 | (2009.01) |
| H04W 24/08 | (2009.01) |
| H04W 24/10 | (2009.01) |
| H04W 16/28 | (2009.01) |
| H04W 84/12 | (2009.01) |

(52) U.S. Cl.
CPC ........... *H04W 24/02* (2013.01); *H04W 16/28* (2013.01); *H04W 24/08* (2013.01); *H04W 24/10* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 2002/0188723 A1* | 12/2002 | Choi | .................. | H04L 29/06 709/225 |
| 2005/0009565 A1* | 1/2005 | Kwak | .................. | H04W 48/14 455/561 |
| 2011/0096796 A1* | 4/2011 | Zhang | .................. | H04B 7/0669 370/474 |

OTHER PUBLICATIONS

IEEE Computer Society "Part11:Wireless LAN Medium Access Control(MAC)and Physical Layer(PHY) Specifications Amendment3:Enhancements for Very High Throughput in the 60 GHz Band" IEEE Std 802.11ad, 2012.
IEEE Computer Society "Part11:Wireless LAN Medium Access Control(MAC)and Physical Layer(PHY) Specifications Amendment5:Enhancements for Higher Throughput" IEEE Std 802.11n, 2009.

* cited by examiner

*Primary Examiner* — Jutai Kao
(74) *Attorney, Agent, or Firm* — Seed IP Law Group LLP

(57) ABSTRACT

A method for performing spatial sharing between an existing SP and a candidate SP includes transmitting a first measurement request to an STA involved in the candidate SP carrying measurement configuration information for measurement over primary tier 1 channel of a tier 2 channel. The measurement configuration information includes the method that is to be used for the requested measurement, the measurement start time, the measurement duration, the number of time blocks within the measurement duration, the number of concurrent measurements to be performed using plural RX antenna configurations, and the method for reporting results of plural concurrent measurements, wherein the duration of each time block is the same.

9 Claims, 28 Drawing Sheets

METHOD OF SPATIAL SHARING IN WIRELESS COMMUNICATIONS SYSTEM

BACKGROUND

1. Technical Field

The present disclosure generally pertains to wireless communications and, more particularly, to a method for achieving spatial sharing in a directional wireless local area network (WLAN) system.

2. Description of the Related Art

Interest in unlicensed 60 GHz millimeter wave (mmW) networks is increasing. WirelessHD technology is the first 60 GHz mmW industry standard, which enables multi-gigabit wireless streaming of high-definition audio, video, and data among consumer electronics, personal computer, and portable products. Another multi-gigabit wireless communications technology operating over the 60 GHz mmW frequency band is Wireless Gigabit Alliance (WiGig) technology, which has been standardized by the Institute of Electrical and Electronic Engineers (IEEE) as the IEEE 802.11ad standard (see IEEE Std 802.11ad TM-2012, December 2012).

The WiGig technology supplements and extends the IEEE 802.11 media access control (MAC) layer and is backward compatible with the IEEE 802.11 WLAN standard. The WiGig MAC supports a centralized network architecture such as an infrastructure basic service set (BSS) or a personal BSS (PBSS), where the central coordinator, e.g., access point (AP) or personal BSS control point (PCP), transmits beacons to synchronize all stations (STAs) in the network. Rather than other IEEE 802.11 WLAN technologies operating over 2.4 GHz or 5 GHz frequency band, the WiGig technology makes extensive use of beamforming (BF) to achieve directional transmissions.

SUMMARY

In one general aspect, the techniques disclosed here feature a method for performing spatial sharing via PCP/AP between an existing SP and a candidate SP, the method including generating first measurement configuration information used for a first measurement request in the PCP/AP. The first measurement configuration information includes a first requested measurement, a first measurement start time, a first measurement duration, a first number of time blocks within the measurement duration, a first number of concurrent measurements to be performed using plural RX antenna configurations, and a first method for reporting results of plural concurrent measurements. The first measurement duration of each time block is the same. The method includes transmitting the first measurement request to an STA involved in the candidate SP carrying the first measurement configuration information for measurement over primary tier 1 channel of a tier 2 channel.

This invention can carry out most suitable SPSH using channel bonding and MIMO.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
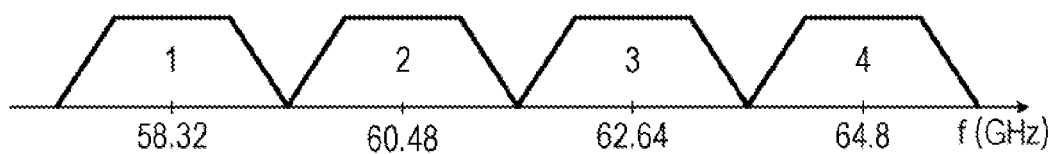
FIG. 1 shows a diagram illustrating an example single-tier channelization in the 60 GHz mmW frequency band.

FIG. 1 is a diagram illustrating an example single-tier channelization in the 60 GHz mmW frequency band, which divides the 60 GHz mmW frequency band into four channels with a channel bandwidth (CBW)=2.16 GHz. The channels with a channel number (CN)=1, 2, 3 and 4 center at frequencies 58.32 GHz, 60.48 GHz, 62.64 GHz and 64.8 GHz, respectively.

Figure 2:
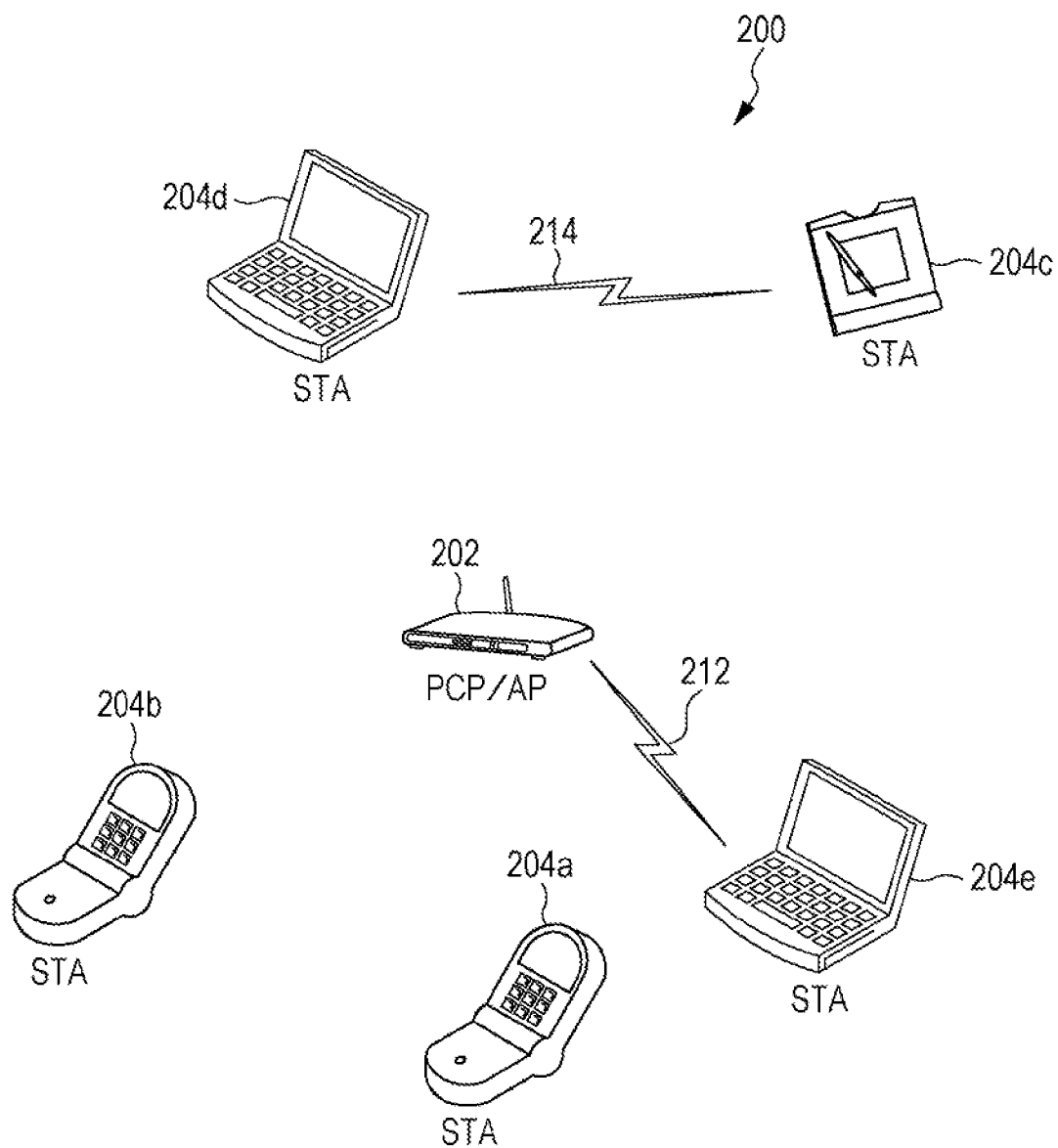
FIG. 2 shows a diagram illustrating an example centralized WiGig network based on the single-tier channelization.

FIG. 2 is a diagram illustrating an example centralized WiGig network 200, which is based on the single-tier channelization shown in FIG. 1. The centralized WiGig network 200, which operates at a tier 1 channel, includes a plurality of STAs 204 and a PCP/AP 202 including STA functionality as well. The PCP/AP 202 can communicate with one of the STAs 204 (e.g., 204e) via a communication link 212. One of the STAs 204 (e.g., 204c) can also directly communicate with another of the STAs 204 (e.g., 204d) via a communication link 214.

Figure 3:
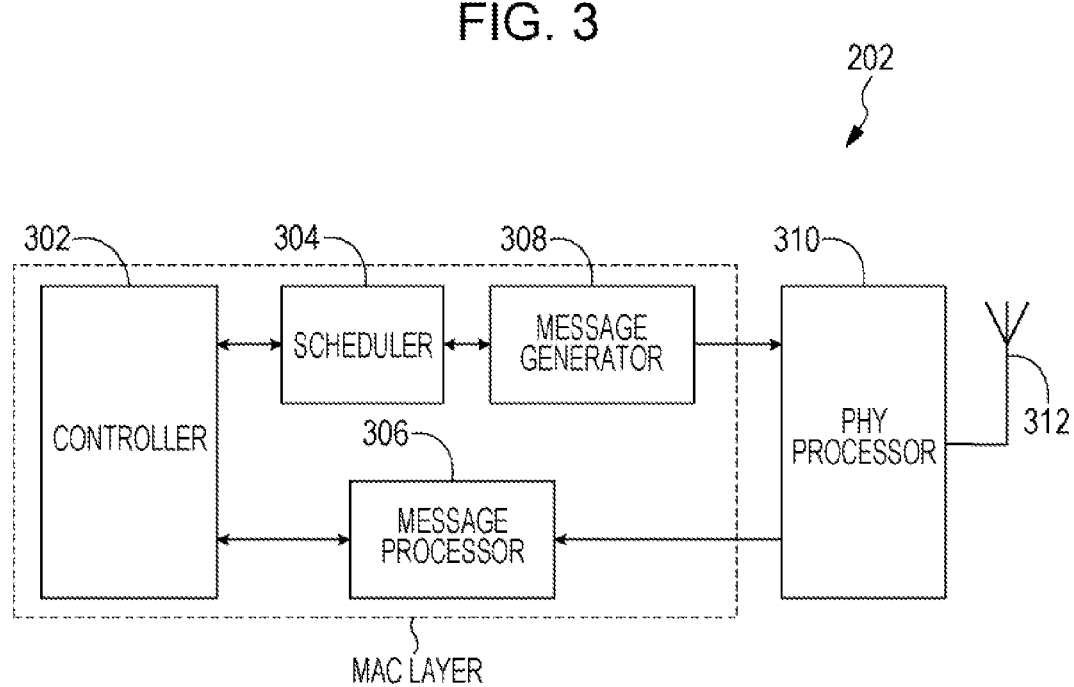
FIG. 3 shows a block diagram illustrating example architecture of PCP/AP in the centralized WiGig network based on the single-tier channelization.

FIG. 3 is a block diagram illustrating example architecture of the PCP/AP 202 in the centralized WiGig network 200. The PCP/AP 202 comprises a controller 302, a scheduler 304, a message generator 308, a message processor 306, a PHY processor 310, and an antenna 312. The controller 302 is a MAC protocol controller and controls general MAC protocol operations. The scheduler 304 schedules the allocation of channel access periods under the control of the controller 302. The message generator 308 receives scheduling information from the scheduler 304 and generates corresponding control, data or management messages such as beacons, which are transmitted through the antenna 312 after physical layer (PHY) processing by PHY processor 310. The antenna 312 may be a single element antenna, an adaptive antenna array, or a switched beam antenna. On the other hand, the message processor 306 analyzes the messages received from the plurality of STAs 204 and provides them to the controller 302.

Figure 4:
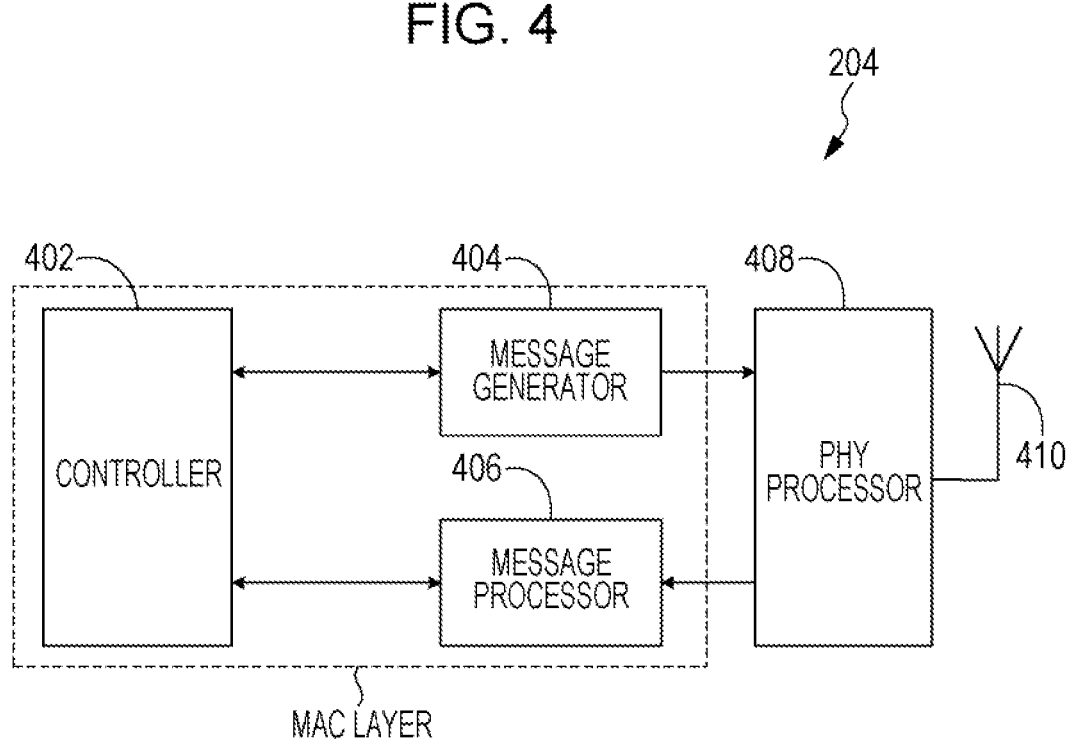
FIG. 4 shows a block diagram illustrating example architecture of STA in the centralized WiGig network based on the single-tier channelization.

FIG. 4 is a block diagram illustrating example architecture of the STAs 204 in the centralized WiGig network 200. Each of the plurality of STAs 204 comprises a controller 402, a message generator 404, a message processor 406, a PHY processor 408, and an antenna 410. The controller 402 is a MAC protocol controller and controls general MAC protocol operations. The message generator 404 generates control, data or management messages under the control of the controller 402, which are transmitted through the antenna 410 after PHY processing by PHY processor 408.

On the other hand, the message processor 406 analyzes control, data or management messages received from the PCP/AP 102 under the control of the controller 402, and provides them to the controller 402.

In the WiGig network 200 shown in FIG. 2, channel access by the plurality of STAs 204 occurs during beacon intervals (BIs) and is coordinated using a schedule, which is generated by the PCP/AP 202 and may be communicated to the STAs 204 using beacons. The STAs 204 receive scheduling information and access the medium during the scheduled periods using the access rules specific to that period.

Figure 5:
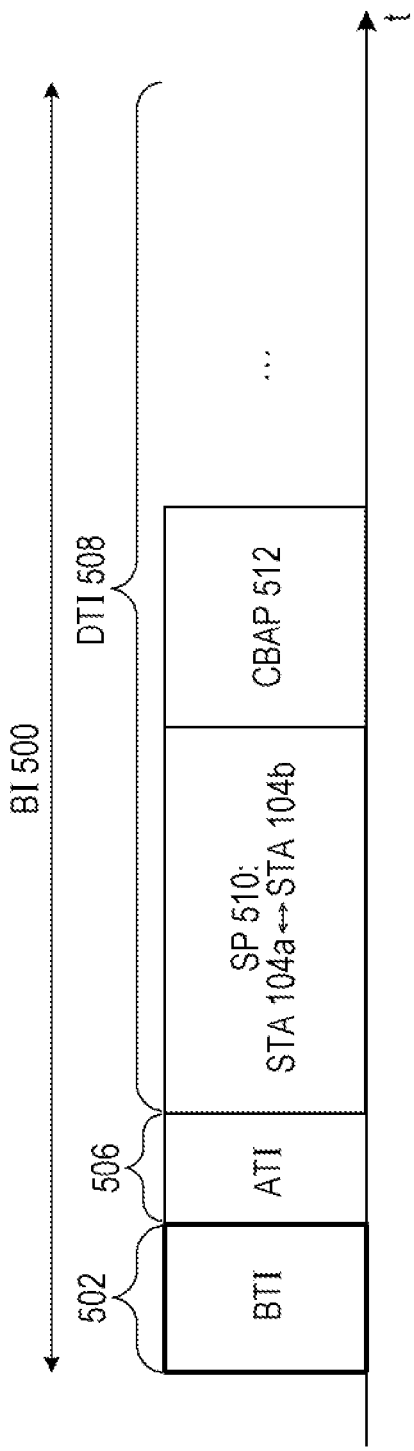
FIG. 5 shows a diagram illustrating channel access periods within a BI based on the single-tier channelization.

FIG. 5 is a diagram illustrating the channel access periods within a BI 500. The BI 500 may comprise of three types of access periods: Beacon Transmission Interval (BTI) 502, announcement transmission interval (ATI) 506, and data transfer interval (DTI) 508. The BTI 502 is an access period during which the PCP/AP 202 performs BF training with directional transmission of plural beacons through all sectors of the antenna 312 in order to reach the full extent of transmission coverage of the plurality of STAs 204. The ATI 506 is a request response based management access period between the PCP/AP 202 and the plurality of STAs 204. In the DTI 508, message exchanges are performed between the plurality of STAs 204 and between the PCP/AP 202 and the individual STAs 204. The DTI 508 further includes a plurality of access periods, e.g., a service period (SP) 510 and a contention-based access period (CBAP) 512. The SP 510 is channel time reserved for communications between the PCP/AP 202 and an STA or a pair of STAs (e.g., 204a and 204b). STAs involved in a SP should perform BF training with each other before engaging in any other communication or performing any measurements. After BF training is completed, for each STA involved in a SP, a TX antenna configuration and a RX antenna configuration are determined to be used for single stream transmission during the SP.

The WiGig MAC introduces a so-called spatial sharing (SPSH) mechanism to maximize PBSS/infrastructure BSS performance. According to the WiGig SPSH mechanism, SPs belonging to different STAs in the same spatial vicinity may be allowed to be scheduled concurrently over the same channel. An SP to be assessed for SPSH with other scheduled (existing) SPs or considered to be reallocated in the BI is termed as a candidate SP.

Figure 6:
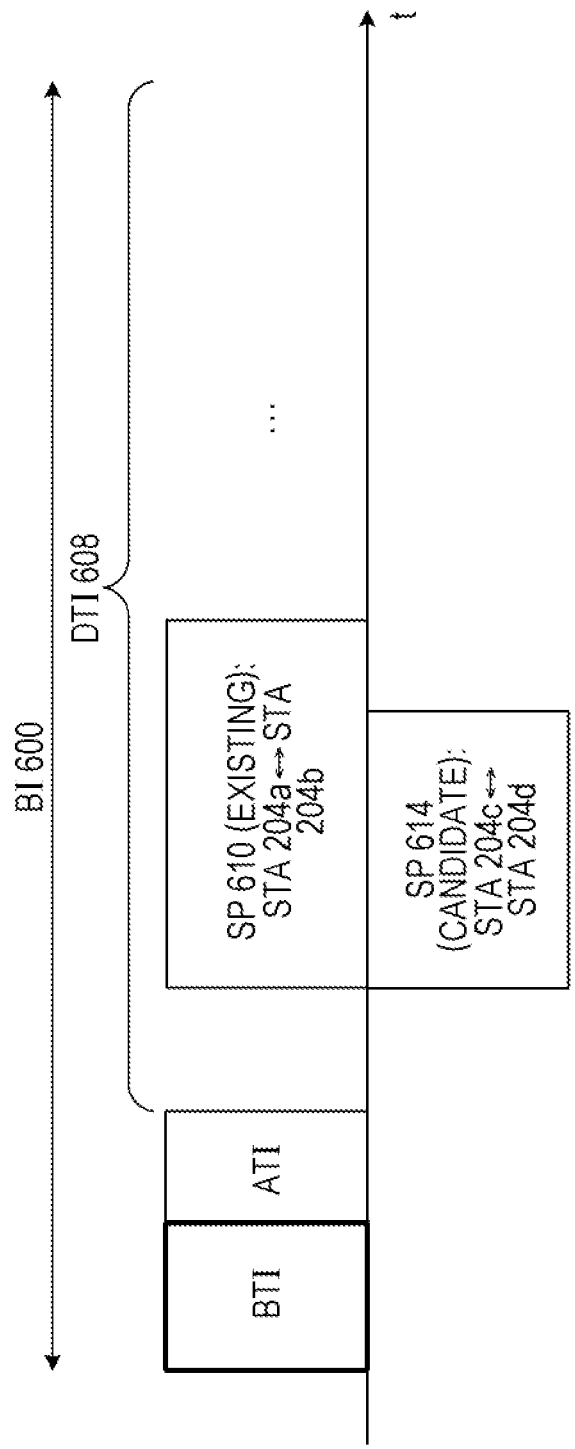
FIG. 6 shows a diagram illustrating an example SPSH scenario between two SPs within a BI based on the single-tier channelization.

FIG. 6 is a diagram illustrating an example SPSH scenario between two SPs within a BI 600. The DTI 608 within the BI 600 includes a plurality of access periods, e.g., a first SP 610 and a second SP 614. The first SP 610 is supposed to be the existing SP and is reserved, for example, for communications between the STAs 204a and 204b. The second SP 614 is supposed to be the candidate SP and is reserved, for example, for communications between the STAs 204c and 204d. The candidate SP 614 is scheduled to be overlapping in time with the existing SP 610 over the same channel within the BI 600.

Figure 7:
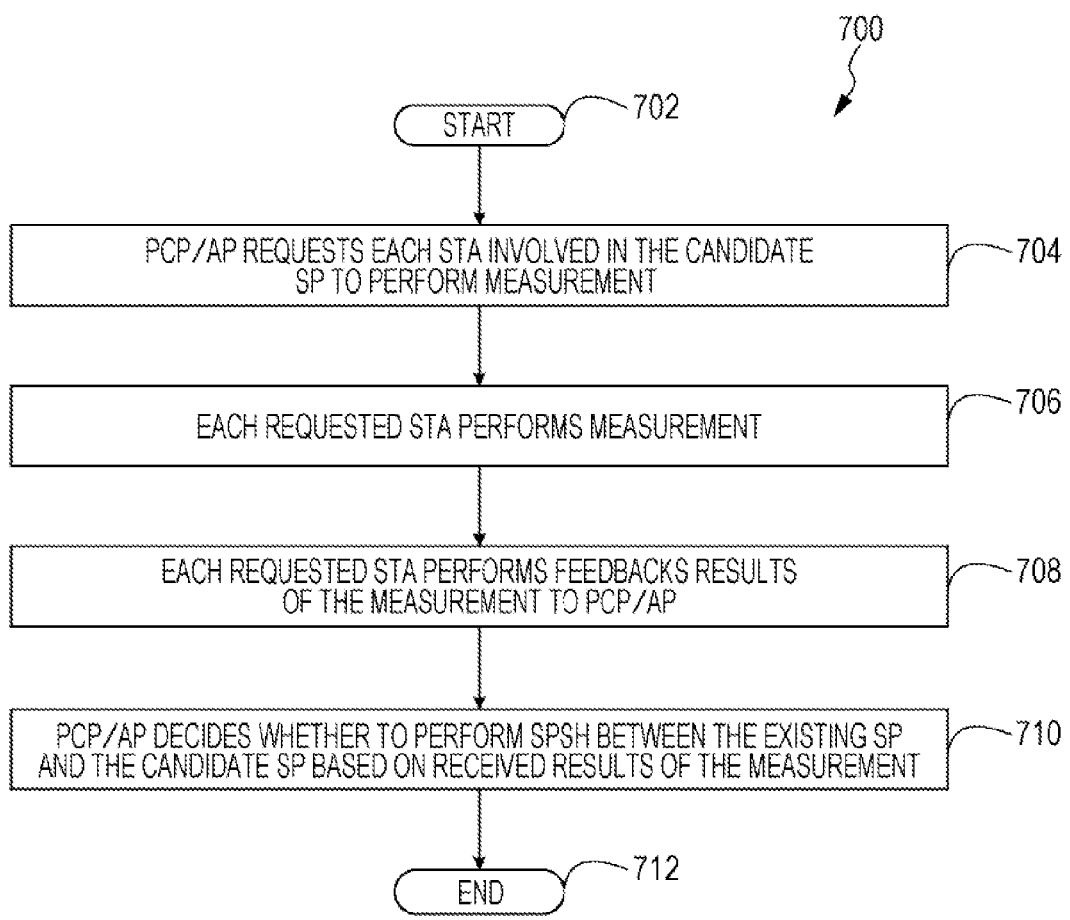
FIG. 7 shows a flow chart illustrating a method for achieving SPSH between an existing SP and a candidate SP according to the prior art.
Figure 8:
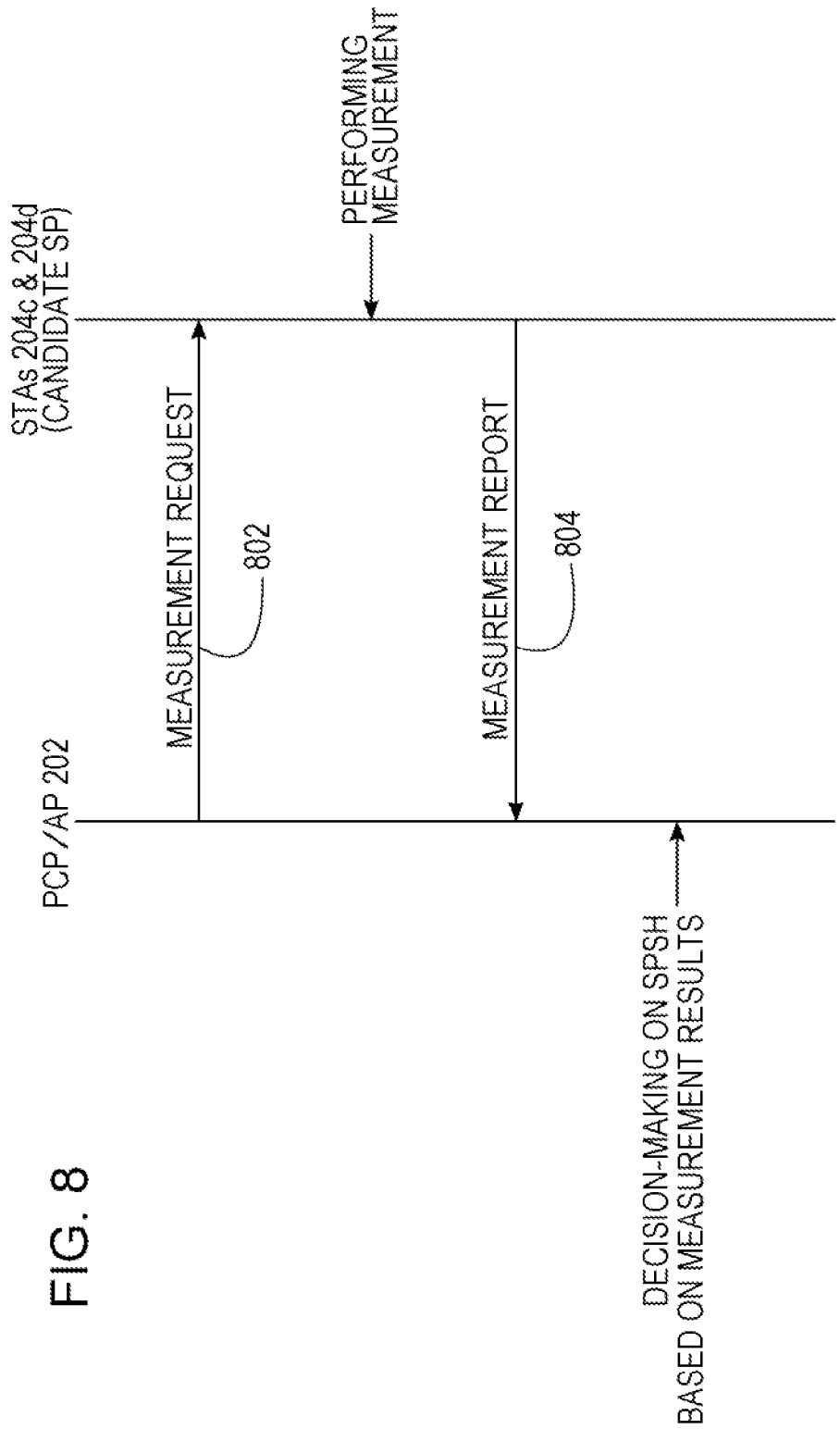
FIG. 8 shows a diagram illustrating message exchange between PCP/AP and STAs involved in SPSH according to the prior art method.

FIG. 7 is a flow chart illustrating a method 700 for achieving SPSH between the existing SP 610 and the candidate SP 614 according to the prior art. It is supposed that the candidate SP 614 has not been allocated channel time before the SPSH assessment is initiated. FIG. 8 is a diagram illustrating message exchange between the PCP/AP 202 and the STAs involved in the candidate SP 614 according to the method 700.

The method 700 starts the SPSH assessment at Step 702. At Step 704, the PCP/AP 202 transmits a measurement request message 802 to each STA (i.e., 204c and 204d) involved in the candidate SP 614 to request performing measurement for the purpose of assessing the possibility for SPSH with the existing SP 610. The measurement request message 802 carries the measurement configuration information for the requested measurement, which will be detailed later. At Step 706, after receiving the measurement request message 802, each requested STA shad carry out the measurement according to the measurement configuration information in the measurement request message 802. Note that a requested STA (e.g., 204*c*) shall carry out the measurement employing the same RX antenna configuration as is used when receiving frames from its target STA (e.g., 204*d*) involved in the candidate SP 614. At Step 708, each requested STA feedbacks results of the measurement to the PCP/AP 202 using a measurement report message 804. At Step 710, the PCP/AP 202 decides whether to perform SPSH between the existing SP 610 and the candidate SP 614 based on the results of measurement. The method 700 stops at Step 712.

Figure 9:
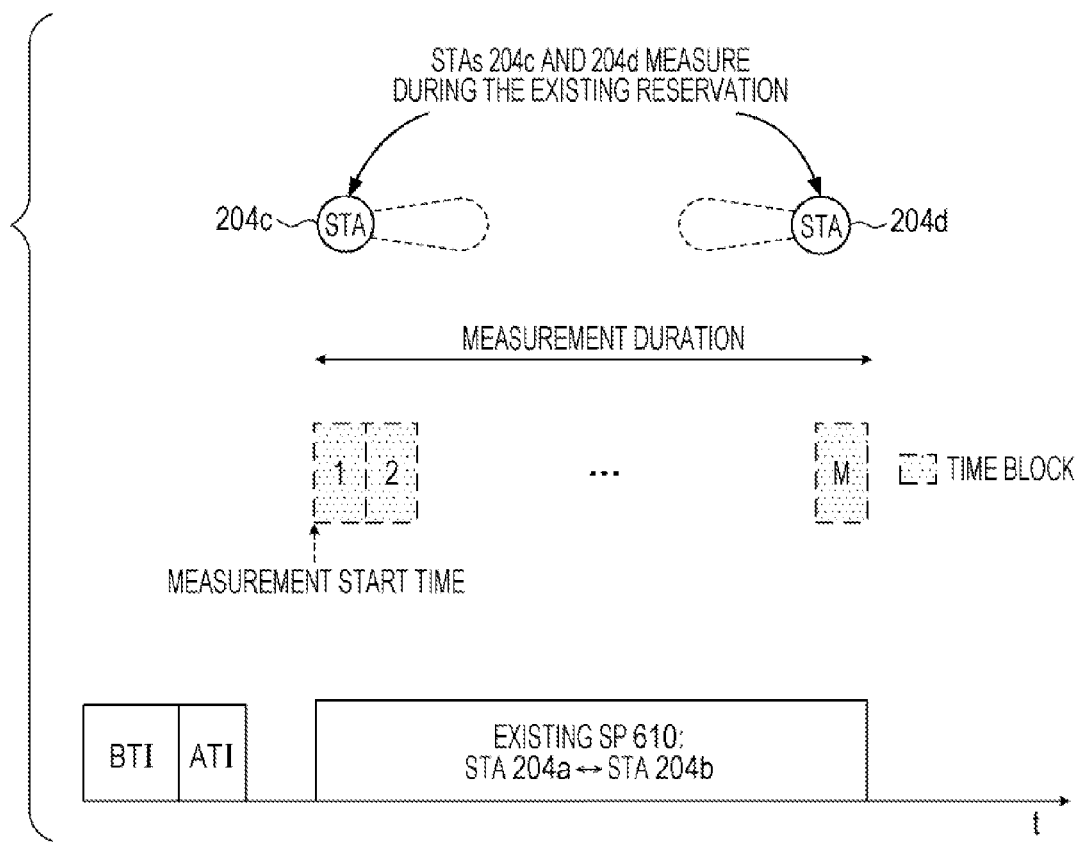
FIG. 9 shows a diagram illustrating the SPSH assessment between an existing SP and a candidate SP according to the prior art method.
Figure 10:
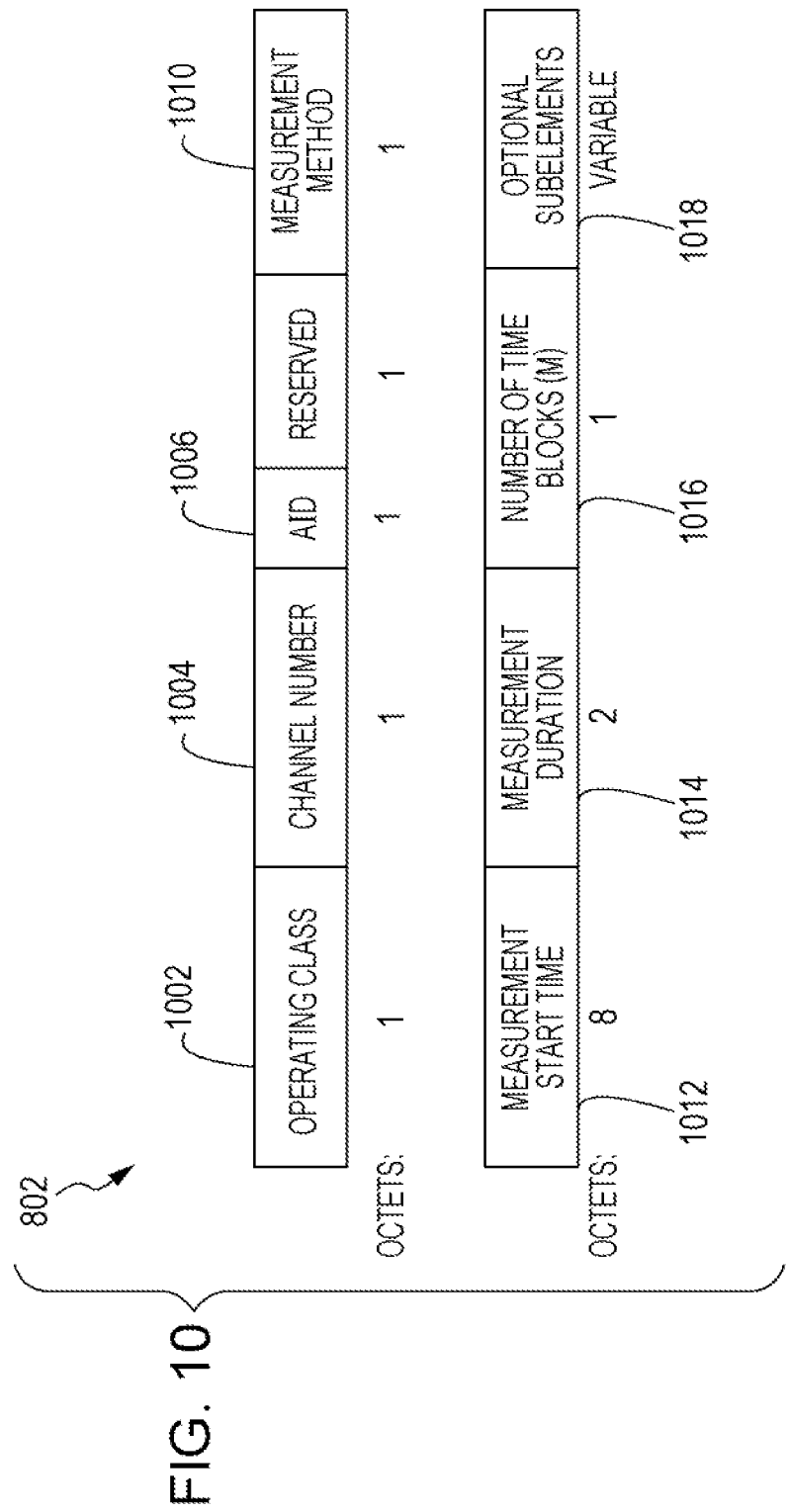
FIG. 10 shows a diagram illustrating an example format of measurement request message according to the prior art method.

FIG. 10 is a diagram illustrating an example format of the measurement request message 802, which includes an Operating Class field 1002, a Channel Number field 1004, an AID field 1006, a Measurement Method field 1010, a Measurement Start Time field 1012, a Measurement Duration field 1014, a Number of Time Blocks field 1016 and Optional Subelements field 1018. The Operating Class field 1002 and the Channel Number field 1004, respectively, indicate the channel set and the CN for which the requested measurement applies. Namely, the Operating Class field 1002, together with the Channel Number field 1004, specifies the measurement channel. The AID field 1006 indicates the target STA, implying which specific RX antenna configuration is to be used for the requested measurement. The Measurement Method field 1010 indicates the method that is to be used by the requested STA to carry out the measurement and report back in the measurement report message 804, e.g., average noise plus interference power indicator (ANIPI). The Measurement Start Time field 1012 indicates the time at which the requested measurement starts. The Measurement Duration field 1014 indicates the duration of the requested measurement. The relation of the Measurement Start Time field 1012 and the Measurement Duration field 1014 in the measurement request message 802 is shown in FIG. 9. The Number of Time Blocks field 1016 indicates the number of time blocks within the measurement duration where the duration of each time block is the same. The Measurement Start Time field 1012, together with the Measurement Duration field 1014 and the Number of Time Blocks field 1016, offers measurement timing information for the requested measurement. The Optional Subelements field 1018 contains zero or more subelements and may be used for functional extension.

Figure 11:
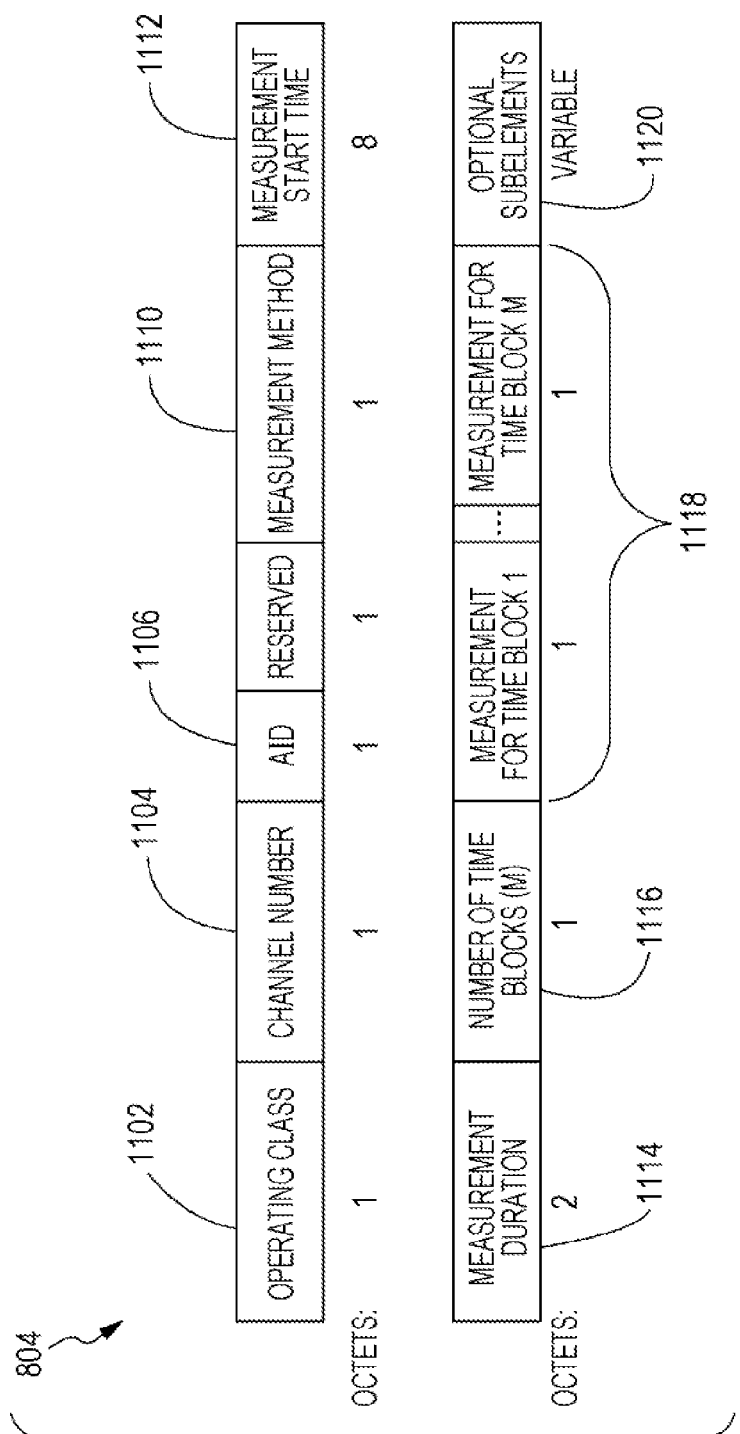
FIG. 11 shows a diagram illustrating an example format of measurement report message according to the prior art method.

FIG. 11 is a diagram illustrating an example format of the measurement report message 804, which includes an Operating Class field 1102, a Channel Number field 1104, an AID field 1106, a Measurement Method field 1110, a Measurement Start Time field 1112, a Measurement Duration field 1114, a Number of Time Blocks field 1116, a plurality of Measurement for Time Block fields 1118 and an Optional Subelements field 1120. The Operating Class field 1102 and the Channel Number field 1104, respectively, indicate the channel set and the CN for which the measurement applies. The AID field 1106 indicates the target STA. The Measurement Method field 1110 indicates the method that was used by the STA to carry out the measurement. The Measurement Start Time field 1112 indicates the time at which the measurement started. The Measurement Duration field 1114 indicates the duration of the measurement. The Number of Time Blocks field 1116 indicates the number of time blocks within the measurement duration. Each of the Measurement for Time Block fields 1118 indicates the result of measurement over a specific time block. The format of the Measurement for Time Block fields 1118 is specified by the Measurement Method field 1110. The Optional Subelements field 1120 contains zero or more subelements and can be used for functional extension.

Figure 12:
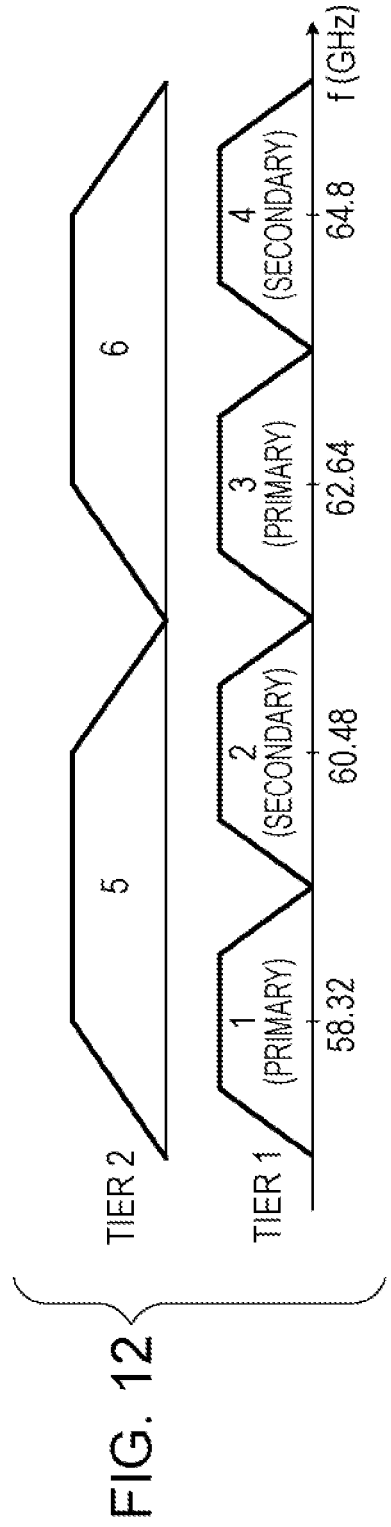
FIG. 12 shows a diagram illustrating an example two-tier channelization in the 60 GHz mmW frequency band.

FIG. 12 is a diagram illustrating an example two-tier channelization in the 60 GHz mmW frequency band. In the first tier, the 60 GHz mmW frequency band is divided into four channels with CBW=2.16 GHz each in a same manner as the one-tier channelization shown in FIG. 1. In the second tier, the 60 GHz mmW frequency band is segmented into two channels with CBW=4.32 GHz each. The channels with CN=5 and 6 center at frequencies 59.4 GHz and 63.72 GHz, respectively. In terms of frequency range, the tier 1 channels with CN=1 and 2 are covered by the tier 2 channel with CN=5. From the perspective of the tier 2 channel with CN=5, the channel with CN=1 is called primary tier 1 channel and the channel with CN=2 is called secondary tier 1 channel. Similarly, from the perspective of the tier 2 channel with CN=6, the channel with CN=3 is called primary tier 1 channel and the channel with CN=4 is called secondary tier 1 channel.

Figure 13:
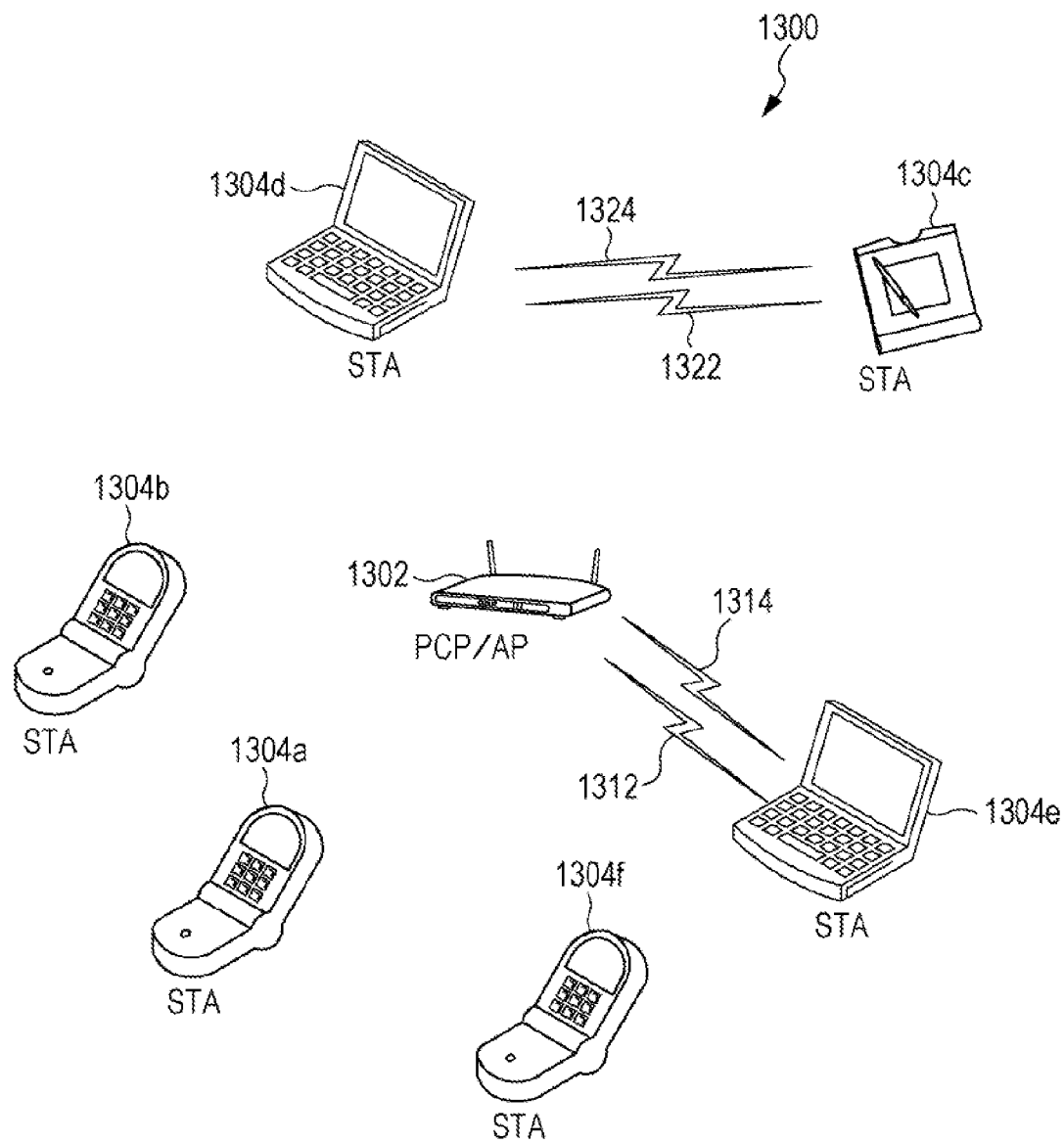
FIG. 13 shows a diagram illustrating an example centralized WiGig network based on the two-tier channelization.

FIG. 13 is a diagram illustrating an example centralized WiGig network 1300 which is based on the two-tier channelization shown in FIG. 12. The centralized WiGig network 1300, which supports multiple input multiple output (MIMO) transmission over a tier 2 channel or its primary tier 1 channel, includes a plurality of STAs 1304 and a PCP/AP 1302 including STA functionality as well. The PCP/AP 1302 can communicate with one of the STAs (e.g., 1304*e*) via a MIMO communication link 1312 over a tier 2 channel (e.g., CN=5) or a MIMO communication link 1314 over its primary tier 1 channel (i.e., CN=1). Similarly, one of the STAs (e.g., 1304*c*) can communicate with another of the STAs (e.g., 1304*d*) via a MIMO communication link 1322 over the tier 2 channel or a MIMO communication link 1324 over its primary tier 1 channel.

Figure 14:
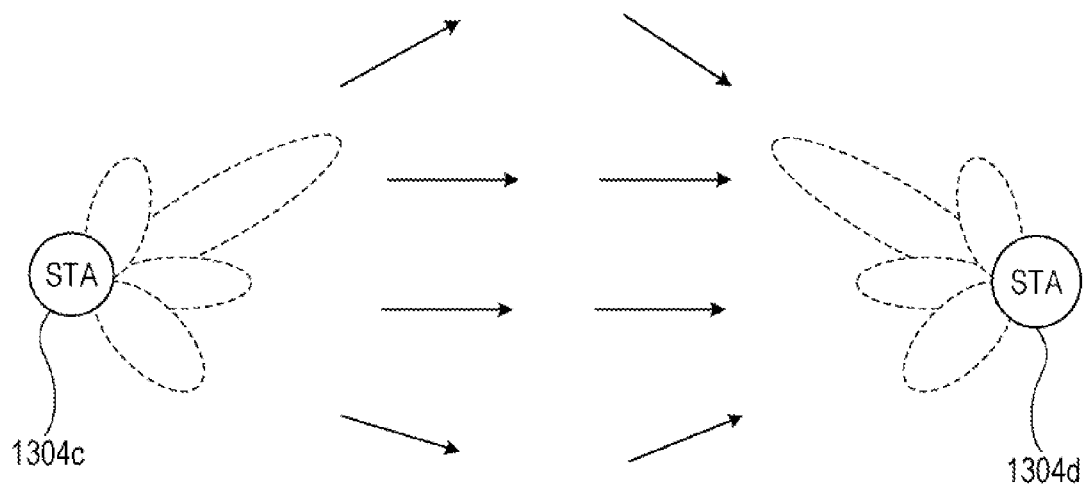
FIG. 14 shows a diagram illustrating MIMO transmission between two STAs.

FIG. 14 is a diagram illustrating an example MHO transmission between an STA (e.g., 1304*d*) and its target STA (e.g., 1304*c*) in the centralized wireless network 1300, where the STA 1304*c* is supposed to be the transmitter of MIMO signal and the STA 1304*d* is supposed to be the receiver of MIMO signal. The STA 1304*c* transmits multiple spatial streams simultaneously using plural TX antenna configurations, which are received by the STA 1304*d* concurrently using plural RX antenna configurations. The plural TX antenna configurations for the STA 1304*c* and plural RX antenna configurations for the STA 1304*d* that are used for MIMO transmission can be obtained via a prior MIMO antenna beam training between the STA 1304*d* and its target STA 1304*c*. Notice that for different channels, plural TX antenna configurations for the STA 1304*c* and plural RX antenna configurations for the STA 1304*d* that are used for MIMO transmission may be also different.

Figure 15:
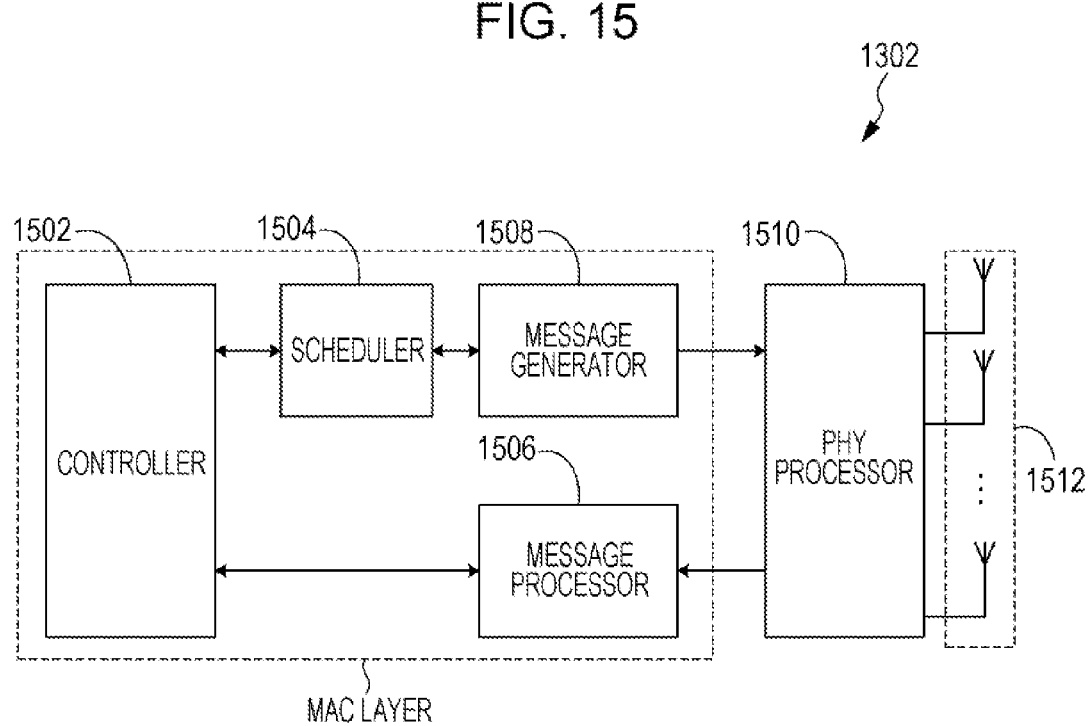
FIG. 15 shows a block diagram illustrating example architecture of PCP/AP in the centralized WiGig network based on the two-tier channelization.

FIG. 15 is a block diagram illustrating example architecture of the PCP/AP 1302 in the centralized WiGig network 1300. The PCP/AP 1302 comprises a controller 1502, a scheduler 1504, a message generator 1508, a message processor 1506, a PHY processor 1510, and a plurality of antennas 1512. The controller 1502 is a MAC protocol controller and controls general MAC protocol operations. The scheduler 1504 schedules the allocation of channel access periods under the control of the controller 1502. The message generator 1508 receives scheduling information from the scheduler 1504 and generates corresponding control, data or management messages such as beacons, which are transmitted through the plurality of antennas 1512 after PHY processing by PHY processor 1510. On the other hand, the message processor 1506 analyzes the messages received from the plurality of STAs 1304 and provides them to the controller 1502. Compared with their counterparts in FIG. 3, the functional blocks such as the controller 1502, the scheduler 1504, the message generator 1508, the message processor 1506 and the PHY processor 1510 are functionally extended and enhanced so that they are able to support MIMO transmission and multiple channel bandwidths.

Figure 16:
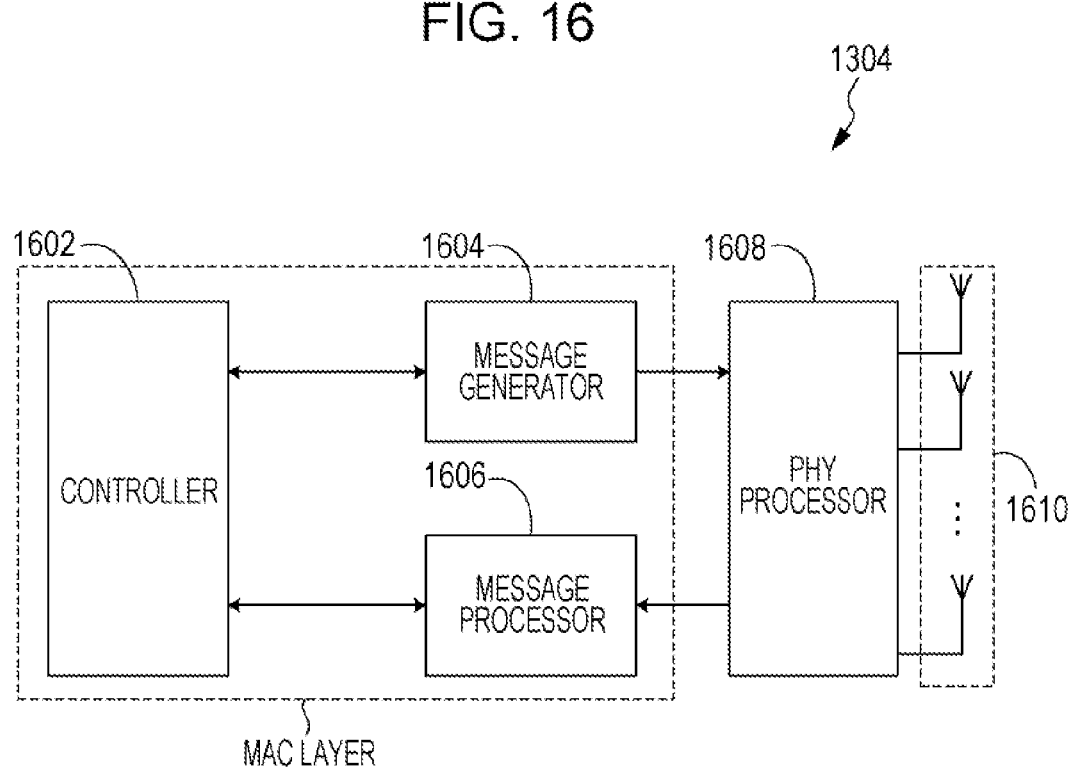
FIG. 16 shows a block diagram illustrating example architecture of STA in the centralized WiGig network based on the two-tier channelization.
Figure 17:
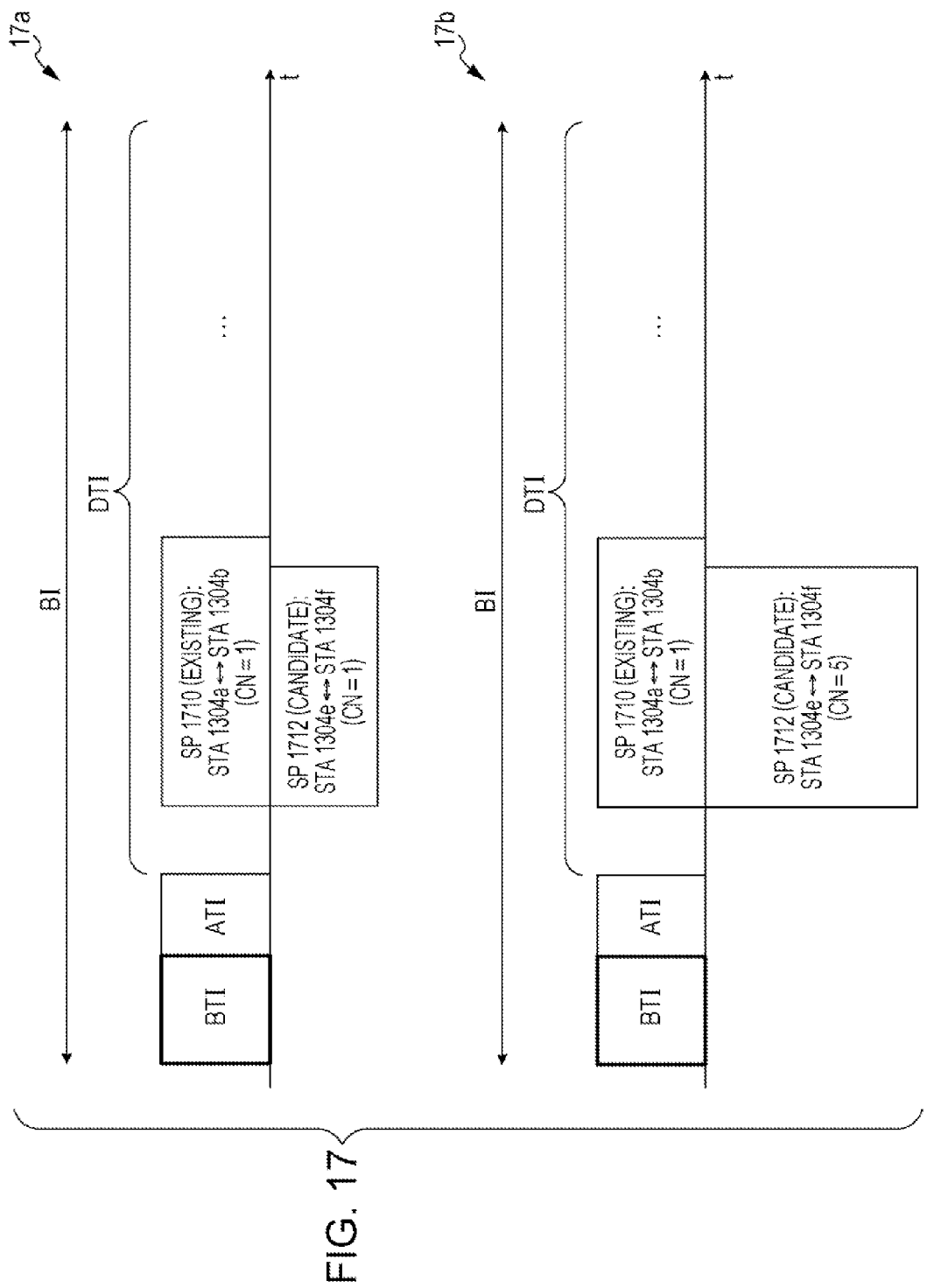
FIG. 17 shows a diagram illustrating a potential SPSH scenario between two SPs within a BI based on the two-tier channelization.

FIG. 16 is a block diagram illustrating example architecture of the STAs 1304 in the centralized WiGig network 1300. Each of the plurality of STAs 1304 comprises a controller 1602, a message generator 1604, a message processor 1606, a PHY processor 1608 and a plurality of antennas 1610. The controller 1602 is a MAC protocol controller and controls general MAC protocol operations. The message generator 1604 generates control, data or management messages under the control of the controller 1602, which are transmitted through the plurality of antennas 1610 after PHY processing by PHY processor 1608. On the other hand, the message processor 1606 analyzes control, data or management messages received from the PCP/AP 1302 under the control of the controller 1602, and provides them to the controller 1602. Compared with their counterparts in FIG. 4, the functional blocks such as the controller 1602, the message generator 1604, the message processor 1606 and the PHY processor 1608 are functionally extended and enhanced so that they are able to support MIMO transmission and multiple channel bandwidths.

With this disclosure, the PCP/AP 1302 can obtain accurate information about channel quality over both the tier 2 channel and its primary tier 1 channel, and thus is able to make an appropriate SPSH decision from measurement results.

Various embodiments of the present disclosure will be described in detail with reference to the annexed drawings. In the following description, a detailed description of known functions and configurations incorporate herein has been omitted for clarity and conciseness.

First Embodiment

Figure 18:
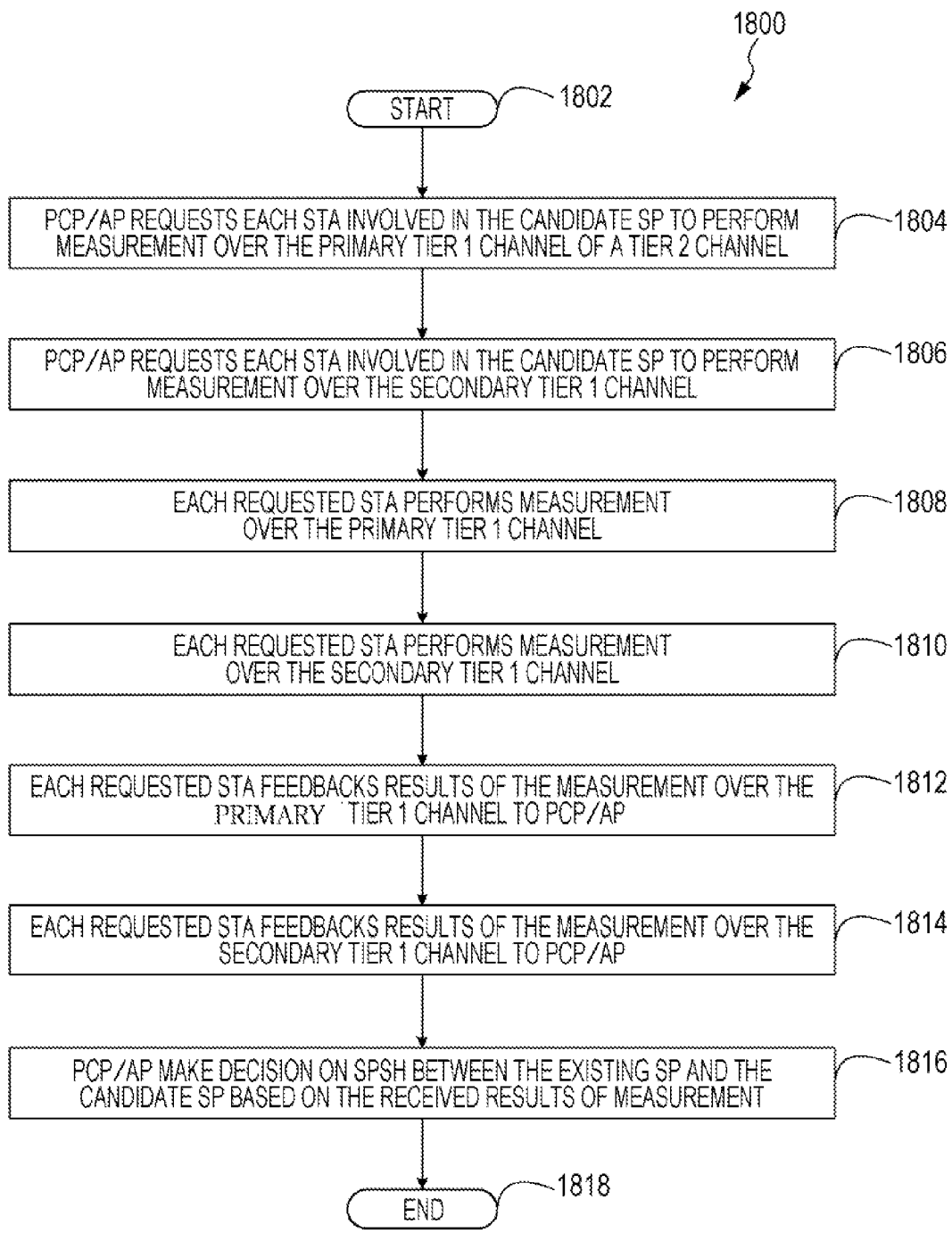
FIG. 18 shows a flow chart illustrating a method for achieving SPSH between an existing SP and a candidate SP according to a first embodiment of the present disclosure.
Figure 19:
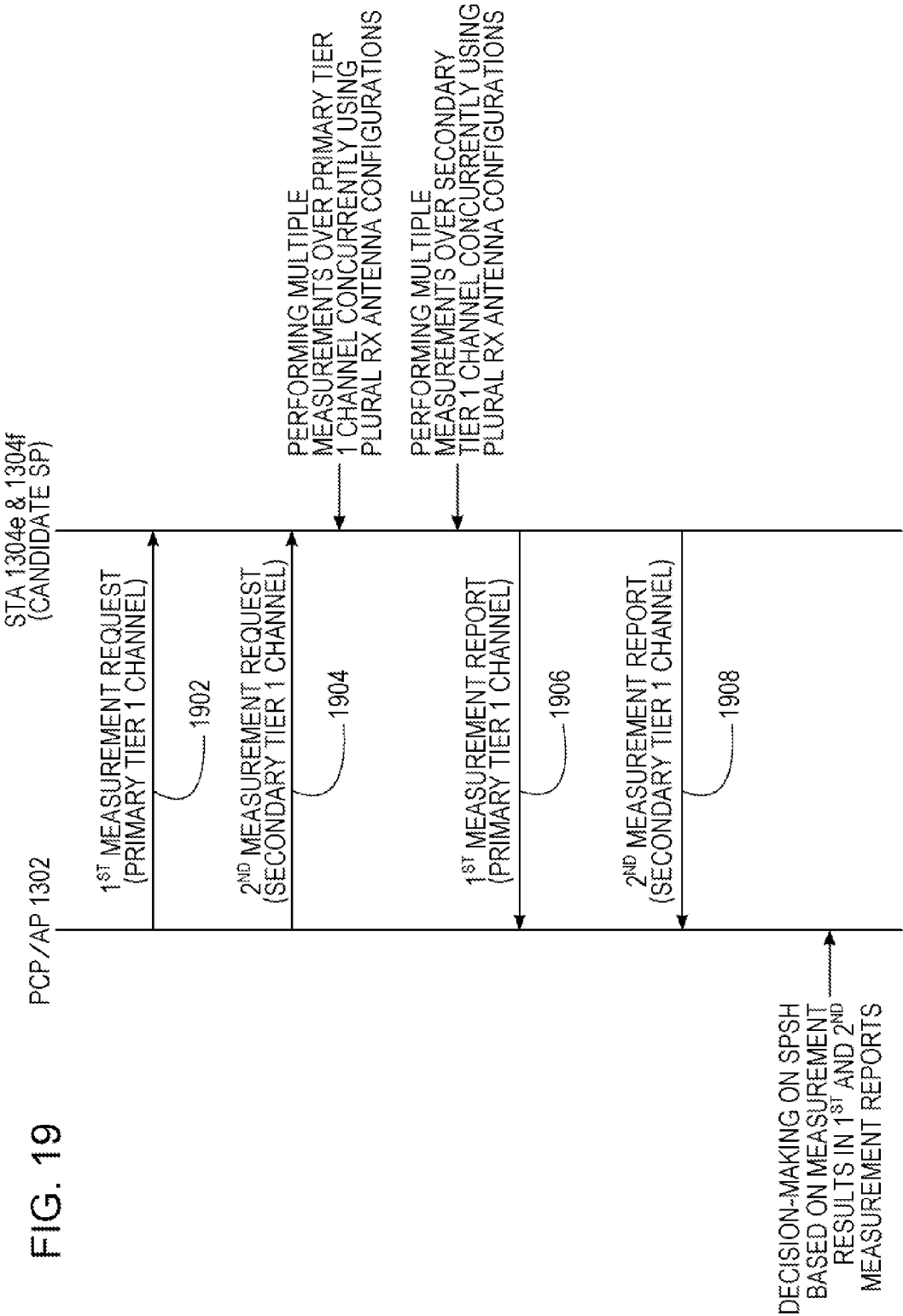
FIG. 19 shows a diagram illustrating message exchange between the PCP/AP and the STAs involved in SPSH according to the first embodiment of the present disclosure.

FIG. 18 is a flow chart illustrating a method 1800 for achieving SPSH between an existing SP 1710 and a candidate SP 1712 according to a first embodiment of the present disclosure. It is supposed that the candidate SP 1712 has not been allocated channel time before the SPSH assessment is initiated. FIG. 19 is a diagram illustrating message exchange between the PCP/AP 1302 and the STAs involved in SPSH according to the method 1800.

The method 1800 starts the SPSH assessment at Step 1802. At Step 1804, the PCP/AP 1302 transmits a first measurement request message 1902 to each STA (i.e., 1304*e* and 1304*f*) involved in the candidate SP 1712 to request performing measurement over the primary tier 1 channel (i.e., CN=1) of a tier 2 channel (e.g., CN=5) at which the existing SP 1710 is located. The first measurement request message 1902 contains measurement configuration information for measurement over the primary tier 1 channel. In addition to measurement channel, measurement method and measurement timing, the measurement configuration information also includes the number of measurements to be performed concurrently using plural RX antenna configurations and the method for reporting results of plural concurrent measurements in a subsequent first measurement report message 1906.

At Step 1806, the PCP/AP 1302 transmits a second measurement request message 1904 to each STA (i.e., 1304*e* and 1304*f*) involved in the candidate SP 1712 to request performing measurement over the secondary tier 1 channel (i.e., CN=2) of the same tier 2 channel. The second measurement request message 1904 contains measurement configuration information for measurement over the secondary tier 1 channel.

Figure 20:
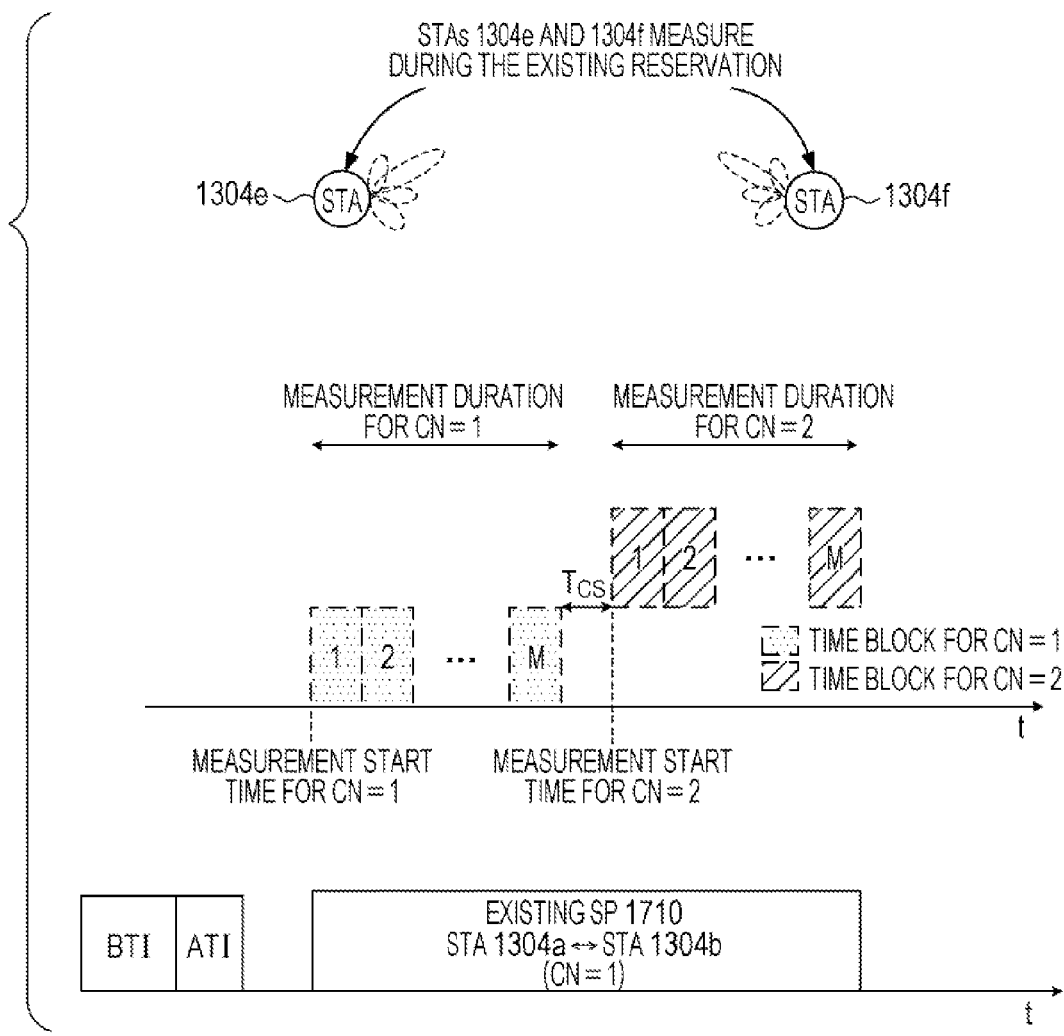
FIG. 20 shows a diagram illustrating the SPSH assessment between the existing SP and the candidate SP according to the first embodiment of the present disclosure.

At Step 1808, each requested STA (i.e., 1304*e* and 1304*f*) carries out plural measurements concurrently using plural RX antenna configurations, respectively, during the time blocks allocated for measurement over the primary tier 1 channel, which are corresponding to a part of the existing SP 1710, as illustrated in FIG. 20. Note that a requested STA (e.g., 1304*e*) shall carry out plural concurrent measurements over the primary tier 1 channel employing the same plural RX antenna configurations as are used when receiving MIMO transmissions from its target STA (i.e., 1304*f*) over the same channel.

At Step 1810, each requested STA (i.e., 1304*e* and 1304*f*) carries out plural measurements concurrently using plural RX antenna configurations, respectively, during the time blocks allocated for measurement over the secondary tier 1 channel, which are corresponding to another part of the existing SP 1710, as illustrated in FIG. 20. Note that a requested STA (e.g., 1304*e*) shall carry out plural measurements over the secondary tier 1 channel employing the same plural RX antenna configurations as are used when receiving MIMO transmissions from its target STA (i.e., 1304*f*) over the same channel.

At Step 1812, each requested STA feedbacks results of the plural concurrent measurements over the primary tier 1 channel to the PCP/AP 1302 using a first measurement report message 1906 according to the measurement configuration information contained in the first measurement request message 1902. At Step 1814, each requested STA feedbacks results of the plural concurrent measurements over the secondary tier 1 channel to the PCP/AP 1302 using a second measurement report message 1908 according to the measurement configuration information carried in the second measurement request message 1904.

According to the present disclosure, there are various ways for reporting results of the plural concurrent measurements. In a first way, results of the plural concurrent measurements during a time block are individually reported. In a second way, the average of results of the plural concurrent measurements during a time block is reported. In a third way, the weighted average of results of the plural concurrent measurements during a time block is reported. In the third way, the weighting factor for a RX antenna configuration depends on received signal quality associated with the RX antenna configuration during MIMO antenna beam training. The better is received signal quality with a RX antenna configuration, and the larger is its weighting factor. Compared with the first way, both the second way and the third way have a much shorter measurement report. But the first way is able to provide much more detailed measurement results.

At Step 1816, the PCP/AP 1302 determines how to achieve SPSH between the existing SP 1710 and the candidate SP 1712 based on the results of measurements which are carried in the first measurement report message 1906 and the second measurement report message 1908. The method 1800 stops at Step 1818.

According to the first embodiment of the present disclosure, after receiving a measurement request, each requested STA needs to perform plural measurements concurrently using plural RX antenna configurations. So inconsistency in terms of measurement results incurred by the prior method 700 can be avoided.

According to the first embodiment of the present disclosure, the PCP/AP 1302 can obtain accurate information about channel quality over both primary tier 1 channel and secondary tier 1 channel of a tier 2 channel, from which it is able to further estimate channel quality over the tier 2 channel, and thus is able to make an appropriate decision on SPSH between the existing SP 1710 and the candidate SP 1712.

Figure 21:
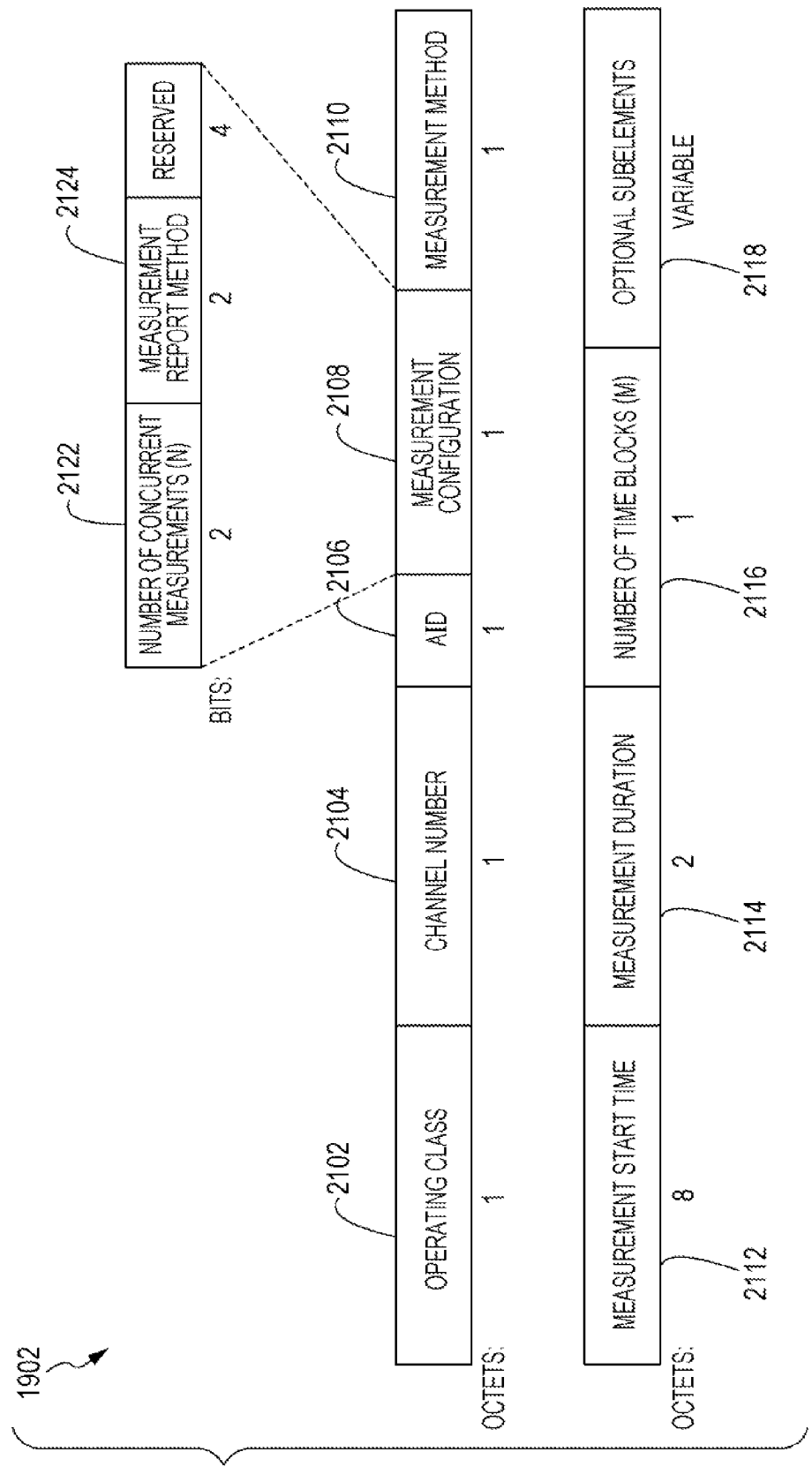
FIG. 21 shows a diagram illustrating an example format of measurement request message according to the first embodiment of the present disclosure.

FIG. 21 is a diagram illustrating an example format of the measurement request message 1902 (or 1904) according to the first embodiment of the present disclosure. The measurement request message 1902 includes an Operating Class field 2102, a Channel Number field 2104, an AID field 2106, a Measurement Configuration field 2108, a Measurement Method field 2110, a Measurement Start Time field 2112, a Measurement Duration field 2114, a Number of Time Blocks (M) field 2116 and Optional Subelements field 2118. Except for the Measurement Configuration field 2108, the other fields can be defined in a similar manner to their counterparts in the measurement request message 802 shown in FIG. 10.

The Measurement Configuration field 2108 further includes a Number of Concurrent Measurements (N) field 2122 and a Measurement Report Method field 2124. The Number of Concurrent Measurements (N) field 2122 indicates how many measurements are b be performed concurrently using plural RX antenna configurations for the requested measurement. The Measurement Report Method field 2124 indicates how results of N concurrent measurements are to be reported in the subsequent measurement report message.

Figure 22:
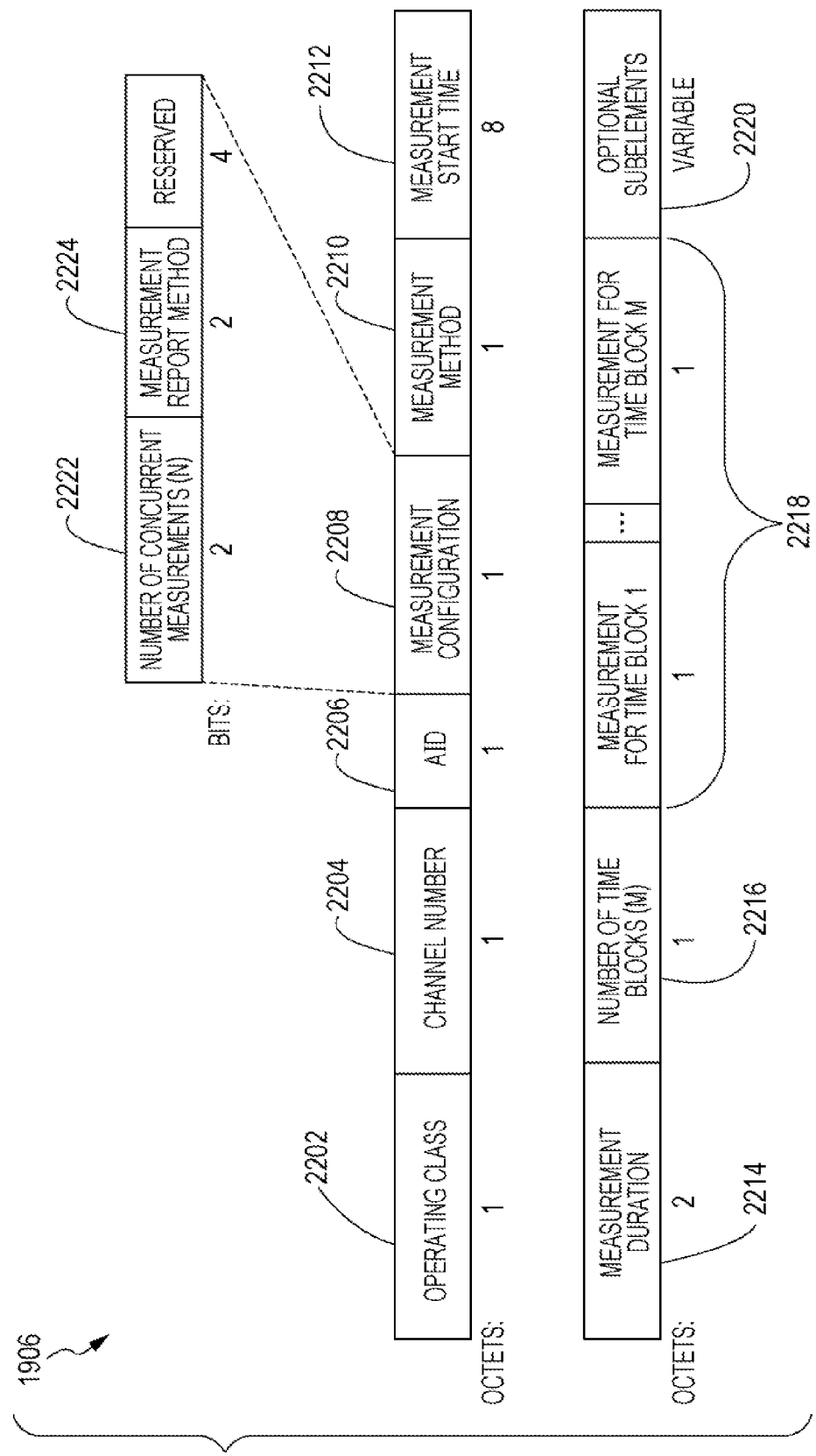
FIG. 22 shows a diagram illustrating an example format of measurement report message according to the first embodiment of the present disclosure.

FIG. 22 is a diagram illustrating an example format of the measurement report message 1906 (or 1908) according to the first embodiment of the present disclosure. The measurement report message 1906 includes an Operating Class field 2202, a Channel Number field 2204, an AID field 2206, a Measurement Configuration field 2208, a Measurement Method field 2210, a Measurement Start Time field 2212, a Measurement Duration field 2214, a Number of Time Blocks (M) field 2216, a plurality of Measurement for Time Block fields 2218 and an Optional Subelements field 2220. Except for the Measurement Configuration field 2208, the other fields can be defined in a similar manner to their counterparts in the measurement report message 804 shown in FIG. 11.

The Measurement Configuration field 2208 further includes a Number of Concurrent Measurement (N) field 2222 and a Measurement Report Method field 2224. The Number of Concurrent Measurement (N) field 2222 indicates how many measurements were performed concurrently using plural RX antenna configurations. The Measurement Report Method field 2224 indicates how results of N concurrent measurements are reported in this measurement report message.

In case that the Measurement Report Method field 2224 of a measurement report message indicates that results of N concurrent measurements during a time block are individually reported, measurement results corresponding to a first RX antenna configuration will be contained in the plurality of Measurement for Time Block fields 2218 of the same measurement report message. Measurement results corresponding to the remaining (N−1) RX antenna configurations will be carried in a so-called Extended Measurement Report subelement of the same measurement report message.

In case that the Measurement Report Method field 2224 of a measurement report message indicates that the average of results of N concurrent measurements during a time block is reported or indicates that the weighted average of results of N concurrent measurements during a time block is reported, measurement results corresponding to N RX antenna configurations will be entirely contained in the plurality of Measurement for Time Block fields 2218 of the same measurement report message.

Figure 23:
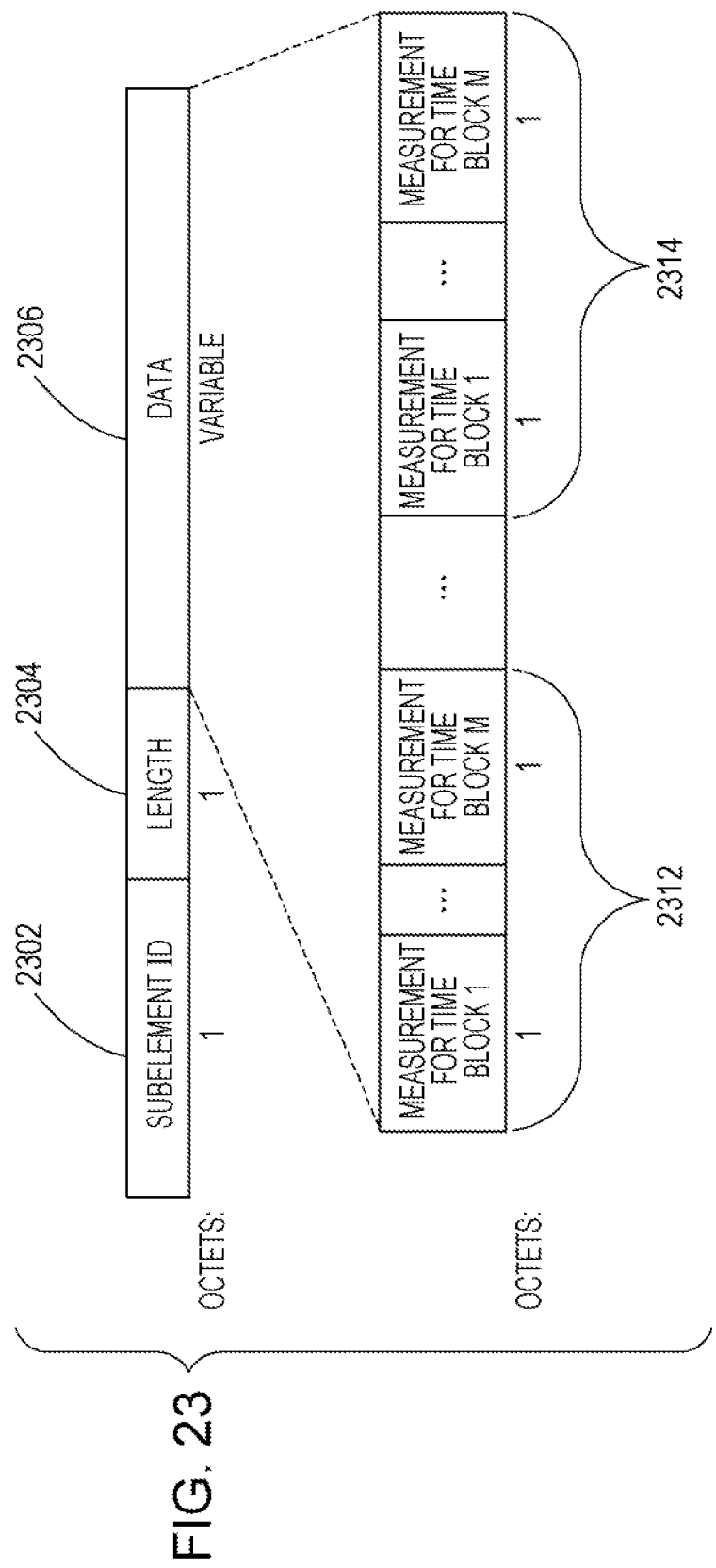
FIG. 23 shows a diagram illustrating an example format of the Extended Measurement Report subelement according to the first embodiment of the present disclosure.

FIG. 23 is a diagram illustrating an example format of the Extended Measurement Report subelement according to the first embodiment of the present disclosure, which includes a Subelement ID field 2302, a Length field 2304 and a Data field 2306. The Data field 2306 further includes (N−1) M Measurement for Time Block fields, which can be divided into (N−1) groups with M Measurement for Time Block fields each. Each group corresponds to a specific RX antenna configuration which was used for the measurement. For example, the group 2312 corresponds to the second RX antenna configuration, and the group 2314 corresponds to the N-th RX antenna configuration.

With reference to FIG. 20, according to the first embodiment of the present disclosure, the Measurement Start Time field 2112 in the second measurement request message 1904 (or the second measurement report message 1908) for measurement over the secondary tier 1 channel shall be equal to or larger than Tcs plus the Measurement Start Time field 2112 plus the Measurement Duration field 2114 in the first measurement request message 1902 (or the first measurement report message 1906) for measurement over the primary tier 1 channel, where Tcs accounts for time for switching channel and reconfiguring receiver, and the value of Tcs is either predetermined or configurable. Meanwhile, for keeping measurement results consistent among measurements over the primary and secondary tier 1 channels, the Measurement Configuration field 2108, the Measurement Method field 2110, the Measurement Duration field 2114 and the Number of Time Blocks (M) field 2116 should be the same in the first measurement request message 1902 (or the first measurement report message 1906) and the second measurement request message 1904 (or the second measurement report message 1908). The duration of each time block should also be the same in the first measurement request message 1902 (or the first measurement report message 1906) and the second measurement request message 1904 (or the second measurement report message 1908).

According to the first embodiment of the present disclosure, alternatives exist for the SPSH method 1800. For example, at Step 1806, the PCP/AP 1302 can request each STA involved in the candidate SP 1712 to perform measurement over the tier 2 channel instead of its secondary tier 1 channel. As a consequence, the PCP/AP 1302 can directly obtain accurate information about channel quality over the tier 2 channel and its primary tier 1 channel, and thus is able to make an appropriate decision on SPSH between the existing SP 1710 and the candidate SP 1712. However, using the tier 2 channel instead of its secondary tier 1 channel may incur longer Tcs.

Second Embodiment

Figure 24:
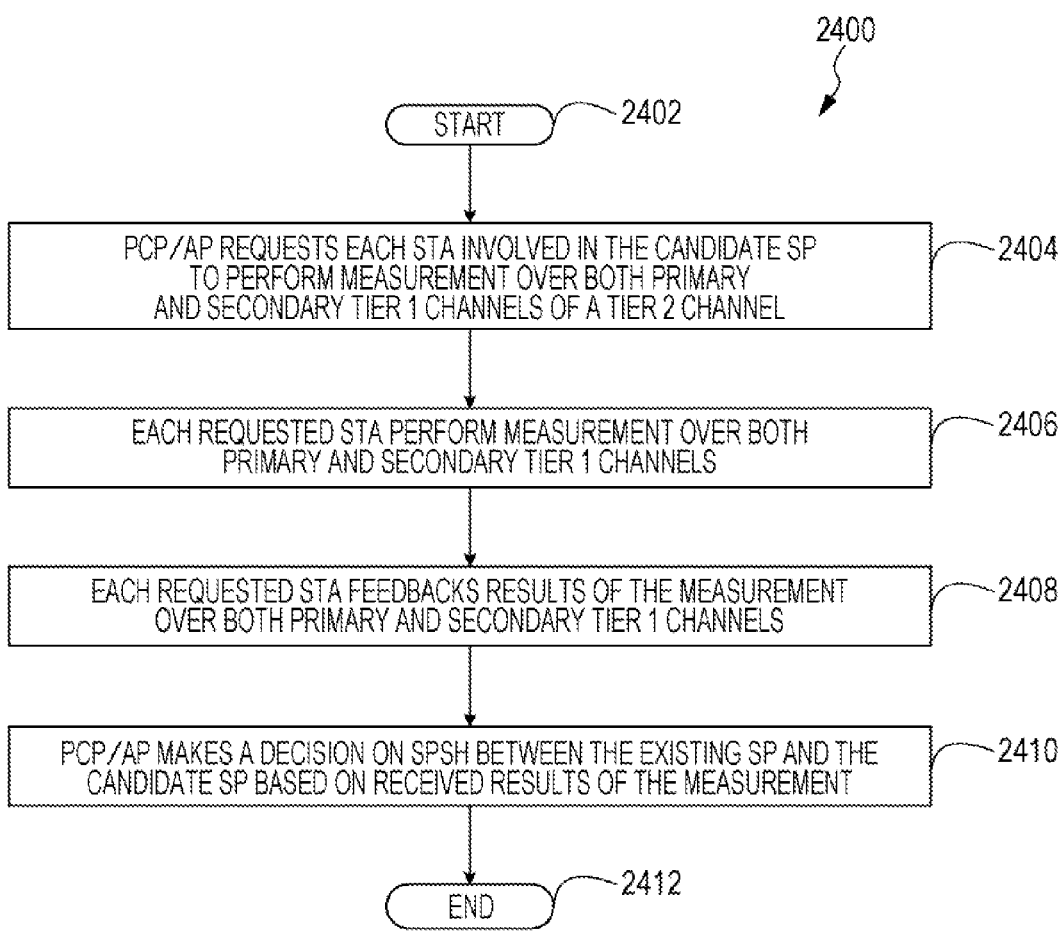
FIG. 24 shows a flow chart illustrating a method for achieving SPSH between an existing SP and a candidate SP according to a second embodiment of the present disclosure.
Figure 25:
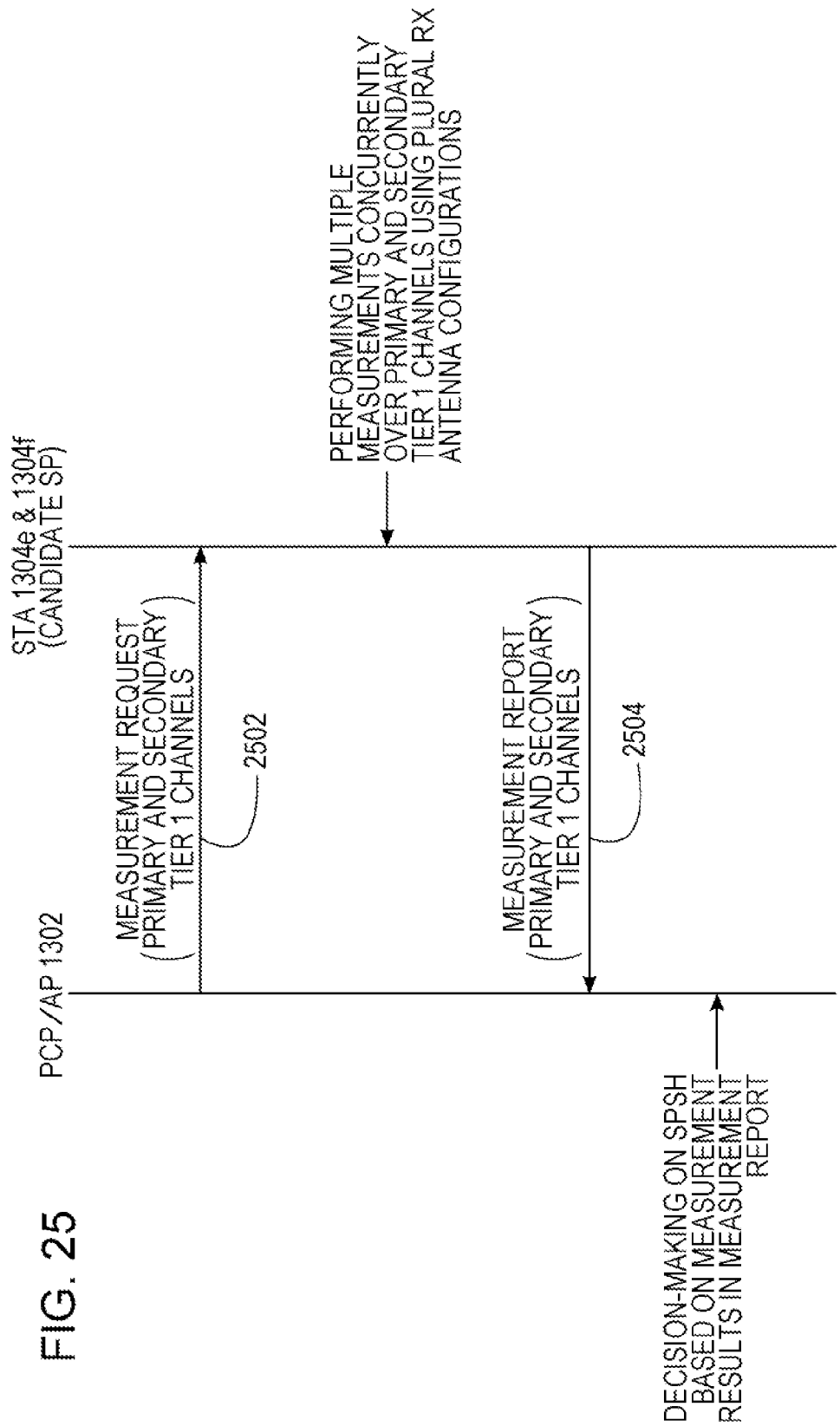
FIG. 25 shows a diagram illustrating message exchange between the PCP/AP and the STAs involved in SPSH according to the second embodiment of the present disclosure.

FIG. 24 is a flow chart illustrating a method 2400 for achieving SPSH between an existing SP 1710 and a candidate SP 1712 according to a second embodiment of the present disclosure. It is supposed that the candidate SP has not been allocated channel time before the SPSH assessment is initiated. FIG. 25 is a diagram illustrating message exchange between the PCP/AP 1302 and the STAs involved in SPSH according to the method 2400.

The method 2400 starts the SPSH assessment at Step 2402. At Step 2404, the PCP/AP 1302 transmits a measurement request message 2502 to each STA (i.e., 1304e or 1304f) involved in the candidate SP 1712 to request performing measurement over both primary tier 1 channel (i.e., CN=1) and secondary tier 1 channel (i.e., CN=2) of a tier 2 channel (e.g., CN=5). The measurement request message 2502 carries measurement configuration information for measurement over the primary and secondary tier 1 channels of the tier 2 channel. In addition to measurement channel, measurement method and measurement timing, the measurement configuration information further includes the method for allocating measurement time blocks between the primary tier 1 channel and the secondary tier 1 channel, the number of measurements to be performed concurrently using plural RX antenna configurations and the method for reporting results of plural concurrent measurements in the subsequent measurement report message 2504.

At Step 2406, after receiving the measurement request message 2502, each requested STA shall carry out plural measurements concurrently using plural RX antenna configurations over the primary tier 1 channel during time blocks allocated to the primary tier 1 channel and carry out plural measurements concurrently using plural RX antenna configurations over the secondary tier 1 channel during time blocks allocated to the secondary tier 1 channel. Time blocks are equally allocated to measurement over each channel. Note that a requested STA (e.g., 1304e) shall carry out plural measurements over the primary tier 1 channel (or secondary tier 1 channel) employing the same plural RX antenna configurations as is used when receiving MHO transmissions from its target STA (i.e., 1304f) over the same channel.

At Step 2408, each requested STA collectively reports back results of plural concurrent measurements over the primary and secondary tier 1 channels to the PCP/AP 1302 using the measurement report message 2504 according to the measurement configuration information indicated in the measurement request message 2502.

At Step 2410, the PCP/AP 1302 determines how to achieve SPSH among the existing SP 1710 and the candidate SP 1712 based on results of the measurements carried in the measurement report message 2504. The method 2400 stops at Step 2412.

According to the second embodiment of the present disclosure, the PCP/AP 1302 can obtain accurate information about channel quality over the primary and secondary tier 1 channels of a tier 2 channel, from which it is able to further estimate channel quality over the tier 2 channel, and thus is able to make an appropriate decision on SPSH between the existing SP 1710 and the candidate SP 1712.

Rather than the first embodiment of the present disclosure which involves two pairs of measurement request and report messages, the second embodiment of the present disclosure involves a single pair of measurement request and report messages. As a consequence, the second embodiment of the present disclosure improves channel efficiency compared with the first embodiment.

According to the second embodiment of the present disclosure, alternatives exist for the SPSH method 2400. For example, at Step 2404, the PCP/AP 1302 can request each STA involved in the candidate SP 1712 to perform measurement over the tier 2 channel and its primary tier 1 channel instead of over its primary and secondary tier 1 channels. As a consequence, the PCP/AP 1302 can directly obtain accurate information about channel quality over the tier 2 channel and its primary tier 1 channel, and thus is able to make an appropriate decision on SPSH between the existing SP 1710 and the candidate SP 1712.

Figure 27:
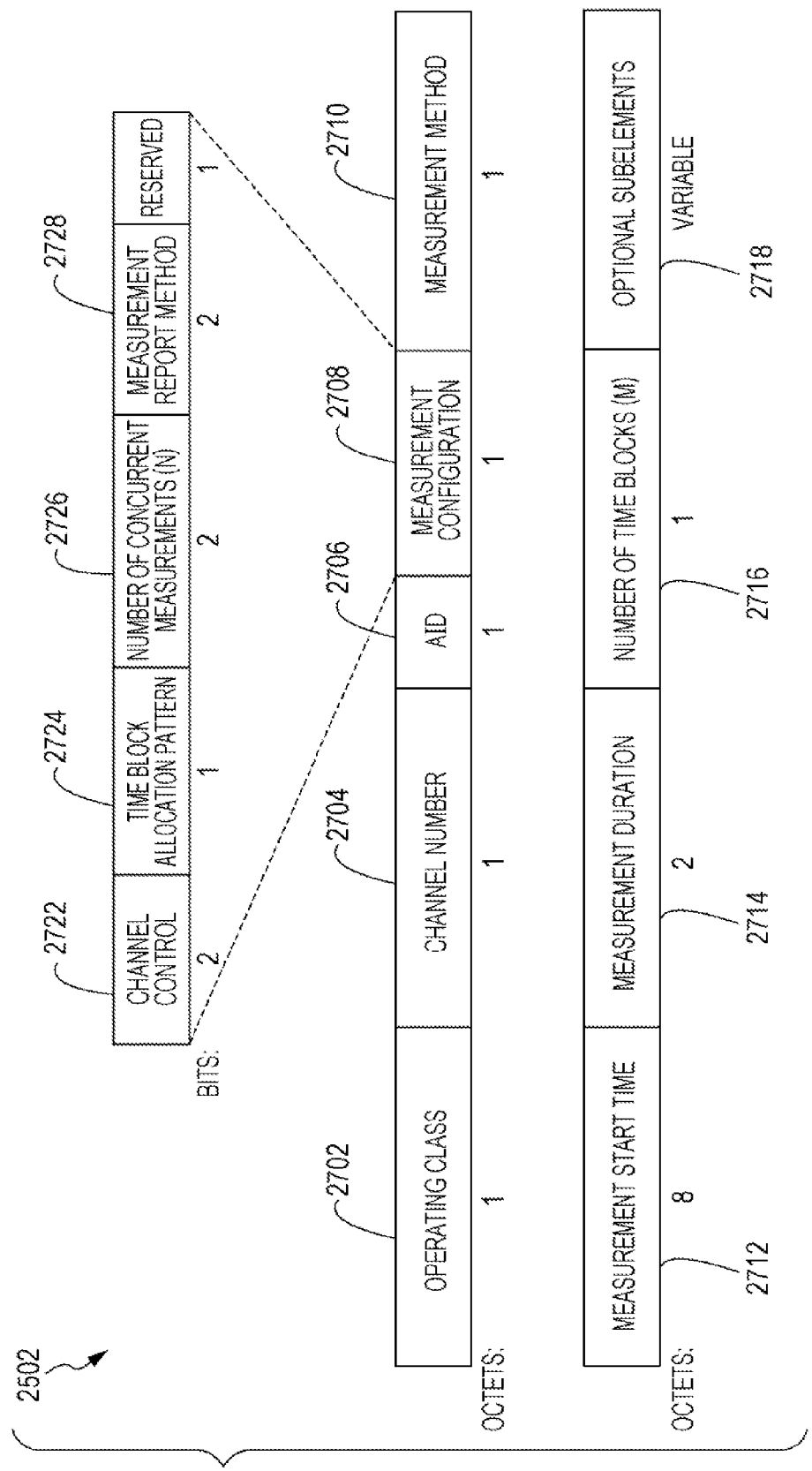
FIG. 27 shows a diagram illustrating an example format of measurement request message according to the second embodiment of the present disclosure.

FIG. 27 is a diagram illustrating an example format of the measurement request message 2502 according to the second embodiment of the present disclosure, which can be envisioned as an extension of the format of the measurement request message 1902 shown in FIG. 21.

The measurement request message 2502 includes an Operating Class field 2702, a Channel Number field 2704, an AID field 2706, a Measurement Configuration field 2708, a Measurement Method field 2710, a Measurement Start Time field 2712, a Measurement Duration field 2714, a Number of Time Blocks (M) field 2716 and Optional Subelements field 2718.

The Measurement Configuration field 2708 includes a Channel Control field 2722, a Time Block Allocation Pattern field 2724, a Number of Concurrent Measurements (N) field 2726 and a Measurement Report Method field 2728. The Channel Control field 2722 indicates whether measurement is performed over a single tier 1 (or tier 2) channel, over both primary and secondary tier 1 channels of a tier 2 channel, or over a tier 2 channel and its primary tier 1 channel. The Time Block Allocation Pattern field 2724 indicates how time blocks are allocated for measurement over two channels, which is valid when the Channel Control field 2722 indicates that the measurement is performed over two channels. The Number of Concurrent Measurements (N) field 2726 indicates how many measurements are to be performed concurrently using plural RX antenna configurations for the requested measurement. The Measurement Report Method field 2728 indicates how results of N concurrent measurements are to be reported in the subsequent measurement report message.

It can be observed that when the Channel Control field 2722 indicates that the measurement is performed over a single tier 1 (or tier 2) channel, the format of the measurement request message 2502 is exactly the same as the format of the measurement request message 1902 shown in FIG. 21. The format of the measurement request message 2502 will thereafter be described for the case that the Channel Control field 2722 indicates that measurement is performed over two channels.

With reference to FIG. 27, the two channels that the measurement applies can be derived from the Operating Class field 2702, the Channel Number field 2704 and the Channel Control field 2722. For example, assume that the Operating Class field 2702 and the Channel Number field 2704 specify a tier 2 channel with CN=5. When the Channel Control field 2722 indicates that measurement is performed over both primary and secondary tier 1 channels of a tier 2 channel, it is easy to deduce that the primary and secondary tier 1 channels that the measurement applies are with CN=1 and CN=2, respectively.

With reference to FIG. 27, the AID field 2706 indicates the target STA. The Measurement Method field 2710 indicates the method that is to be used by the requested STA to carry out the measurement over the two channels and report back in the measurement report message 2504.

The Measurement Start Time field 2712 indicates the time at which the requested measurement over the primary tier 1 channel starts. The Measurement Duration field 2714 indicates the nominal duration of the requested measurement over the two channels. The Number of Time Blocks field 2716 indicates the number of time blocks within the Measurement Duration, where the duration of each time block is the same. The Optional Subelements field 2718 contains zero or more subelements and can be used for functional extension.

Figure 26:
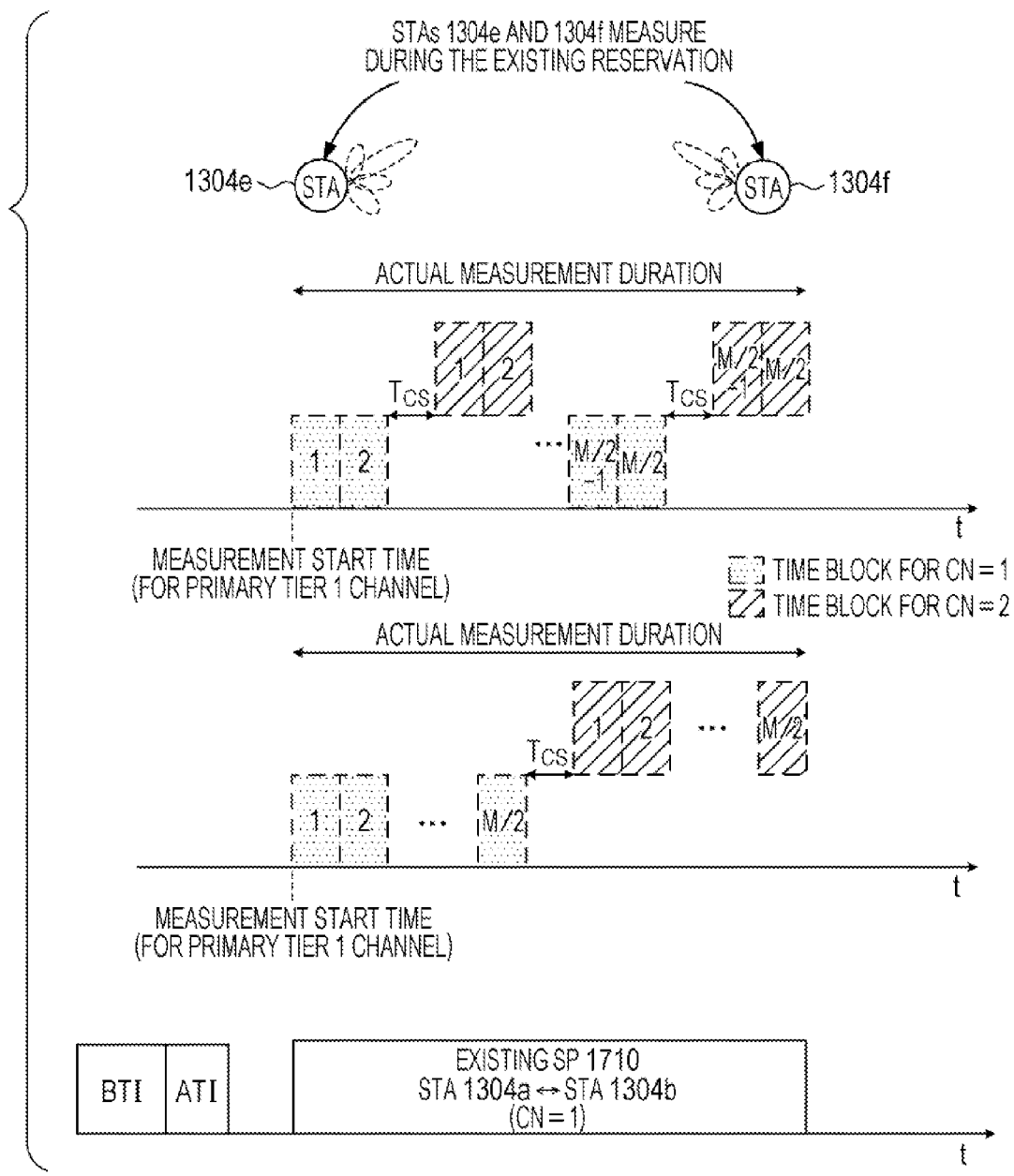
FIG. 26 shows a diagram illustrating the SPSH assessment between the existing SP and the candidate SP according to the second embodiment of the present disclosure.

As mentioned above, how time blocks are allocated to the two channels are specified in the Time Block Allocation Pattern field 2724. As shown in FIG. 26 where the two channels that the measurement applies are supposed to be primary and secondary tier 1 channels of a tier 2 channel, in a first way, time blocks allocated to the primary tier 1 channel may be followed by those allocated to the other channel with a separation of Tcs, where Tcs accounts for time for switching channel and reconfiguring receiver and the value of Tcs is either predetermined or configurable. In a second way, grouped time blocks are alternatively allocated to the two channels, with a group for primary tier 1 channel first and with a separation between neighboring groups of Tcs. The number of time blocks in a group can be either predetermined or configurable. In terms of the first way, channel switch during measurement occurs once, and but channel quality estimate may not be accurate since measurement per channel is performed during a part of whole measurement duration. In terms of the second way, channel quality estimate is more accurate since measurement per channel spreads over whole measurement duration. However, channel switch and receiver reconfiguration during measurement is more frequent and thus consumes more power.

With reference to FIG. 26, the actual measurement duration for measurement over the two channels depends on not only the Measurement Duration but also the Time Block Allocation Pattern. For example, when the Time Block Allocation Pattern indicates that time blocks a located to the primary tier 1 channel are followed by those allocated to the other channel, the actual measurement duration for measurement over the two channels equals to the Measurement Duration plus Tcs. When the Time Block Allocation Pattern indicates that grouped time blocks are alternatively allocated to the two channels, the actual measurement duration for measurement over the two channels equals to Measurement Duration plus T where T=Tcs (number of time block groups−1).

Figure 28:
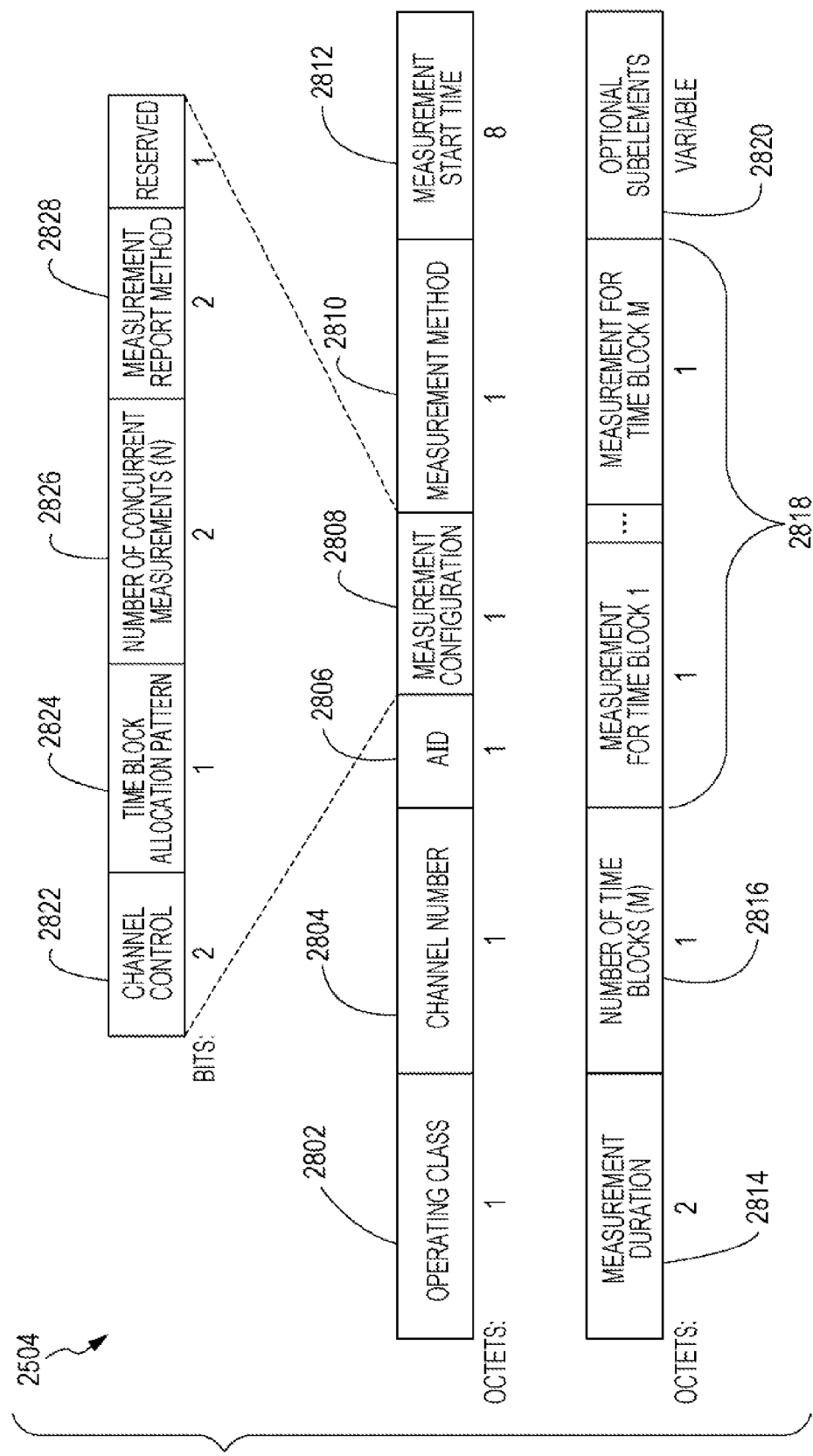
FIG. 28 shows a diagram illustrating an example format of measurement report message according to the second embodiment of the present disclosure.

FIG. 28 is a diagram illustrating an example format of the measurement report message 2504 according to the second embodiment of the present disclosure, which can be envisioned as an extension of the format of the measurement report message 1906 shown in FIG. 22.

The measurement report message 2504 includes an Operating Class field 2802, a Channel Number field 2804, an AID field 2806, a Measurement Configuration field 2808, a Measurement Method field 2810, a Measurement Start Time field 2812, a Measurement Duration field 2814, a Number of Time Blocks (M) field 2816, a plurality of Measurement for Time Block fields 2818 and an Optional Subelements field 2820.

The Measurement Configuration field 2808 includes a Channel Control field 2822, a Time Block Allocation Pattern field 2824, a Number of Concurrent Measurements (N) field 2826 and a Measurement Report Method field 2828. The Channel Control field 2822 indicates whether measurement was performed over a single tier 1 (or tier 2) channel, over both primary and secondary tier 1 channels of a tier 2 channel, or over a tier 2 channel and its primary tier 1 channel. The Time Block Allocation Pattern field 2824 indicates how time blocks were allocated for measurement over two channels, which is valid when the Channel Control field 2822 indicates that the measurement is performed over two channels. The Number of Concurrent Measurements (N) field 2826 indicates how many measurements were performed concurrently using plural RX antenna configurations for the measurement. The Measurement Report Method field 2828 indicates how the results of N concurrent measurements are reported in the measurement report message.

It can be observed that when the Channel Control field 2822 indicates that the measurement was performed over a single tier 1 (or tier 2) channel, the format of the measurement report message 2504 is exactly the same as the format of the measurement report message 1906 shown in FIG. 22. The format of the measurement report message 2504 will thereafter be described for the case that the Channel Control field 2822 indicates that measurement was performed over two channels.

With reference to FIG. 28, the two channels that the measurement applies can be derived from the Operating Class field 2802, the Channel Number field 2804 and the Channel Control field 2822. The AID field 2806 indicates the target STA. The Measurement Method field 2810 indicates the method was used by the requested STA to carry out the measurement over the two channels. The Measurement Start Time field 2812 indicates the time at which the requested measurement over the primary tier 1 channel started. The Measurement Duration field 2814 indicates the total duration of the requested measurement over the two channels. The Number of Time Blocks field 2816 indicates the number of time blocks within the Measurement Duration. The Optional Subelements field 2820 contains zero or more subelements and can be used for functional extension.

In case that the Measurement Report Method field 2828 of a measurement report message indicates that the results of N concurrent measurements during a time block are individually reported, results of the measurement corresponding to a first RX antenna configuration is carried in the plurality of Measurement for Time Block fields 2818 of the same measurement report message. Results of the measurement corresponding to remaining (N−1) RX antenna configurations will be carried in an Extended Measurement Report subelement (see FIG. 23) of the same measurement report message.

In case that the Measurement Report Method field 2828 of a measurement report message indicates that the average of results of N concurrent measurements during a time block is reported or that the weighted average of results of N concurrent measurements during a time block is reported, results of the measurement corresponding to N RX antenna configuration are carried in the plurality of Measurement for Time Block fields 2818 of the same measurement report message.

What is claimed is:
1. A method for performing spatial sharing via Personal basic service set Control Point/Access Point (PCP/AP) between an existing Service Period (SP) and a candidate SP, comprising:
generating first measurement configuration information used for a first measurement request in the PCP/AP, the first measurement configuration information including:
a first requested measurement;
a first measurement start time;
a first measurement duration;
a first number of first time blocks within the first measurement duration;
a first number of concurrent measurements to be performed using plural RX antenna configurations; and
a first method for reporting results of plural concurrent measurements, wherein each first time block within the first measurement duration has the same time; and the method includes transmitting the first measurement request, which carries the first measurement configuration information for measurement over a primary tier 1 channel of a tier 2 channel, to a station (STA) involved in the candidate SP.

2. The method according to claim 1, further comprising:
generating second measurement configuration information used for a second measurement request in the PCP/AP,
the second measurement configuration information including:
   a second requested measurement that is identical to the first requested measurement;
   a second measurement start time;
   a second measurement duration that is identical to the first measurement duration;
   a second number of second time blocks within the second measurement duration that is identical to the first number of the first time blocks;
   a second number of concurrent measurements to be performed using plural receiving (RX) antenna configurations that is identical to the first number of concurrent measurements; and
   a second method for reporting results of plural concurrent measurements that is identical to the first method for reporting results,
wherein each second time block within the second measurement duration has the same time;
the method includes transmitting a second measurement request to the STA carrying measurement configuration information for measurement either over a secondary tier 1 channel of the tier 2 channel or over the tier 2 channel,
wherein the second measurement start time indicated in the second measurement request is not smaller than time Tcs plus the first measurement start time indicated in the first measurement request plus the first measurement duration indicated in the first measurement request, and
wherein time Tcs corresponds to a reconfiguring period of the STA by switching channel, which is either predetermined or configurable.

3. The method according to claim 1, wherein
in the STA, after receiving the first measurement request, the STA performs plural measurements over the primary tier 1 channel concurrently using plural RX antenna configurations, respectively, according to the first measurement configuration information contained in the first measurement request.

4. The method according to claim 1, wherein
in the STA, after receiving the second measurement request, the STA performs plural measurements either over a secondary tier 1 channel of the tier 2 channel or over the tier 2 channel concurrently using plural RX antenna configurations, respectively, according to the second measurement configuration information contained in the second measurement request.

5. The method according to claim 1, further comprising, in the PCP/AP,
receiving a first measurement report from the STA carrying results of the plural concurrent measurements over the primary tier 1 channel, which are reported according to the first measurement configuration information indicated in the first measurement request.

6. The method according to claim 5, wherein
results of plural concurrent measurements over the primary tier 1 channel are individually reported in the first measurement report.

7. The method according to claim 5, wherein
the average of results of plural concurrent measurements over the primary tier 1 channel is reported in the first measurement report.

8. The method according to claim 5, wherein
the weighted average of results of plural concurrent measurements over the primary tier 1 channel is reported in the first measurement report.

9. The method according to claim 1, further comprising:
receiving a second measurement report from the STA carrying results of plural concurrent measurements either over a secondary tier 1 channel of the tier 2 channel or over the tier 2 channel, which are reported according to the second measurement configuration information contained in the second measurement request; and
decision-making on spatial sharing between the existing SP and the candidate SP according to received result for first measurement and second measurement of plural concurrent measurements in both the first measurement report and the second measurement report.

* * * * *